United States Patent
Ikai et al.

(10) Patent No.: US 11,945,056 B2
(45) Date of Patent: Apr. 2, 2024

(54) GAS-SHIELDED ARC WELDING WIRE AND GAS-SHIELDED ARC WELDING METHOD

(71) Applicant: Kobe Steel, Ltd., Kobe (JP)

(72) Inventors: Kazuya Ikai, Kanagawa (JP); Tetsunao Ikeda, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 271 days.

(21) Appl. No.: 16/769,331

(22) PCT Filed: Nov. 29, 2018

(86) PCT No.: PCT/JP2018/044049
§ 371 (c)(1),
(2) Date: Jun. 3, 2020

(87) PCT Pub. No.: WO2019/116917
PCT Pub. Date: Jun. 20, 2019

(65) Prior Publication Data
US 2020/0306896 A1    Oct. 1, 2020

(30) Foreign Application Priority Data
Dec. 15, 2017  (JP) ................. 2017-240614

(51) Int. Cl.
*B23K 35/368*  (2006.01)
*B23K 9/173*  (2006.01)
*B23K 9/23*  (2006.01)
*B23K 35/30*  (2006.01)

(52) U.S. Cl.
CPC ............ *B23K 35/368* (2013.01); *B23K 9/173* (2013.01); *B23K 9/23* (2013.01); *B23K 35/30* (2013.01)

(58) Field of Classification Search
CPC ...... B23K 35/30; B23K 35/368; B23K 9/173; B23K 9/23
See application file for complete search history.

(56) References Cited

U.S. PATENT DOCUMENTS 10,300,565 B2 * 5/2019 Barhorst ............ B23K 35/3086
2001/0027966 A1  10/2001 Iwatsubo et al.

FOREIGN PATENT DOCUMENTS

| JP | 62-224481 A | 10/1987 |
| JP | 64-11092 A | 1/1989 |
| JP | 7-204885 A | 8/1995 |

(Continued)

OTHER PUBLICATIONS

Machine translation of JP 07204885: Hirata, Ferrite steel welding material having excellent high-temperature weld crack resistance, 1995 (Year: 1995).*

(Continued)

*Primary Examiner* — Janie M Loeppke
*Assistant Examiner* — Abigail H Rhue
(74) *Attorney, Agent, or Firm* — Oblon, McClelland, Maier & Neustadt, L.L.P.

(57) ABSTRACT

A gas shielded arc welding wire contains, based on total mass of the wire in terms of mass %: C: 0.01% to 0.50%; Si: 0.01% to 1.50%; Mn: 0.10% to 2.50%; Cr: 5% to 15%; Ni: 0.05% to 1.50%; Mo: 0.1% to 2.0%; V: 0.1% to 1.0%; Nb: 0.01% to 0.20%; REM: 0.001% to 0.050%; S: 0.0010% to 0.0200%; and O: 0.025% or less (including 0%), which satisfies the following relationship: $3.0 \leq (Nb+10\times REM)/(S+O) \leq 200.0$.

12 Claims, 5 Drawing Sheets

(56) References Cited

FOREIGN PATENT DOCUMENTS

| | | | | |
|---|---|---|---|---|
| JP | 07204885 A | * | 8/1995 | ......... B23K 35/0255 |
| JP | 9-122971 A | | 5/1997 | |
| JP | 2001-219292 A | | 8/2001 | |
| JP | 2005-246479 A | | 9/2005 | |
| JP | 2005246479 A | * | 9/2005 | |
| JP | 2015-93287 A | | 5/2015 | |
| WO | WO 2017/043086 A1 | | 3/2017 | |

OTHER PUBLICATIONS

Machine translation of JP 2005246479: Ikeda, Multi-layer carbon dioxide shield arc welding method for thick steel sheets, 2005 (Year: 2005).*

International Search Report dated Jan. 15, 2019 in PCT/JP2018/044049 (with English translation), 5 pages.

Written Opinion of the International Searching Authority dated Jan. 15, 2019 in PCT/JP2018/044049 (with English translation), 10 pages.

* cited by examiner

GAS-SHIELDED ARC WELDING WIRE AND GAS-SHIELDED ARC WELDING METHOD

TECHNICAL FIELD

The present invention relates to a gas shielded arc welding wire and a gas shielded arc welding method suitable for automatic welding.

BACKGROUND ART

A power boiler constituted for thermal power generation requires a material that can be used stably for a long time in an environment of high temperature and high pressure, and a material having particularly excellent high-temperature strength for a welding material. In the related art, high Cr steel is used for the welding material, and examples thereof include those disclosed in Patent Literature 1 and Patent Literature 2.

Patent Literature 1 relates to a welding material for ferritic heat resistant steel used in welding such as a thermal power plant operating in an environment of high temperature and high pressure. The literature discloses that mechanical strength of deposited metal can be increased and welding workability can be improved by only performing relatively simple and convenient welding such as gas metal arc welding (GMAW) by adjusting chemical composition within a specified range.

Patent Literature 2 relates to a welding material, and particularly relates to a welding material and a GMA welding method suitable for gas metal arc (GMA) welding of 8% to 13% Cr steel having excellent high-temperature strength. The literature discloses a welding material capable of GMA welding by adjusting chemical composition within a specified range. The literature also discloses a welding method having excellent arc stability in which the welding material is used and an oxygen concentration in a shielding gas including a mixed gas of Ar gas and He gas is set to 0.25% or less.

CITATION LIST

Patent Literature

Patent Literature 1: JP-A-2015-93287
Patent Literature 2: JP-A-2001-219292

SUMMARY OF INVENTION

Technical Problem

As described above, mechanical performance and welding workability in an environment of high temperature and high pressure are required, and on the other hand, in view of improving welding efficiency, a technique related to welding automation (including automation by a robot) of heat-resistant steel used in a power boiler or the like is desired. However, in the case where GMAW is performed in welding of the heat-resistant steel, a firm Cr oxide is formed on a molten pool surface and an edge of a molten pool during welding. In addition, a welding defect such as lack of fusion or a bad bead shape occurs due to inhibition of flow of molten metal by the formed Cr oxide or arc deflection caused by cathode point dispersion starting from the Cr oxide. Since the welding defect particularly remarkably occurs in multi-layer welding of two or more passes, it is difficult to automate welding of the heat-resistant steel used in the power boiler or the lQike that requires multi-layer welding. Therefore, high quality welding such as gas tungsten arc welding (GTAW) that requires constant human monitoring and manual shielded metal arc welding have been used in the related art.

Patent Literature 1 particularly focuses on the mechanical performance of high-Cr steel and discloses that a content of Cr requires 8.0% to 14.0% by mass, but an influence of the Cr oxide generated during welding is not particularly considered, and even a welding defect caused by the Cr oxide that hinders automation is not considered.

Patent Literature 2 discloses a GMA welding material having a Cr content of 8% to 13% by weight and a welding method thereof, and discloses that arc stability is improved by adding a rare earth metal element (REM), but the Cr oxide generated on the molten pool surface is not considered, and thus flow of molten metal is inhibited and a welding defect such as lack of fusion or a bad bead shape easily occurs, so it is difficult to apply the technique to automation.

Accordingly, an object of the present invention is to provide a gas shielded arc welding wire and a gas shielded arc welding method that realize automation of welding (continuous and automatic welding) even in the case of welding material for high-Cr heat resistant steel, by reducing a welding defect such as lack of fusion or a bad bead shape.

Solution to Problem

A gas shielded arc welding wire of the present invention for solving the above problems contains, based on total mass of the wire in terms of mass %:
C: 0.01% to 0.50%;
Si: 0.01% to 1.50%;
Mn: 0.10% to 2.50%;
Cr: 5% to 15%;
Ni: 0.05% to 1.50%;
Mo: 0.1% to 2.0%;
V: 0.1% to 1.0%;
Nb: 0.01% to 0.20%;
REM: 0.001% to 0.050%;
S: 0.0010% to 0.0200%; and
O: 0.025% or less (including 0%),
which satisfies the following relationship (1):

$$3.0 \leq (Nb + 10 \times REM)/(S + O) \leq 200.0 \quad (1).$$

In a preferable embodiment of the present invention, the gas shielded arc welding wire further contains, based on total mass of the wire in terms of mass %:
N: 0.01% to 0.10%;
W: 3.0% or less (including 0%);
Co: 3.0% or less (including 0%);
Ta: 0.5% or less (including 0%);
B: 0.005% or less (including 0%); and
Cu: 2.0% or less (including 0%),
the balance consisting of Fe and inevitable impurities.

In a preferable embodiment of the present invention, in the gas shielded arc welding wire, a ratio of the Nb content to the REM content satisfies the following relationship (2):

$$1.0 \leq Nb/REM \leq 80.0 \quad (2).$$

In a preferable embodiment of the present invention, the gas shielded arc welding wire contains La and Ce as the REM, and a ratio of the La to the Ce satisfies the following relationship (3):

$$0.2 \leq La/Ce \leq 1.1 \quad (3).$$

5. In a preferable embodiment of the present invention, the gas shielded arc welding wire contains:
REM: 0.001% to 0.050%; and
S: 0.0010% to 0.0200%,
which satisfies the following relationship (4) and the following relationship (5):

$$0.10 \leq O/S \leq 4.00 \quad (4); \text{ and}$$

$$0.30 \leq REM/(S+O) \leq 6.50 \quad (5).$$

A gas shielded arc welding method of the present invention for solving the above problems, includes welding in a shielding gas atmosphere using the gas shielded arc welding wire according to any one of the above.

In a preferable embodiment of the present invention, the gas shielded arc welding method uses an inert gas having a composition in which Ar or He is 100% or a mixed gas having a composition in which a content of Ar or He is 90% or more in volume %, as the shielding gas.

In a preferable embodiment of the present invention, the gas shielded arc welding method uses a gas having a composition in which $CO_2$ is 100% or a mixed gas having a composition in which a content of $CO_2$ is 90% or more in volume %, as the shielding gas,
in which a polarity of the welding wire side is negative.

Advantageous Effects of Invention

In the gas shielded arc welding wire and the gas shielded arc welding method in the present invention, the welding defect such as lack of fusion or a bad bead shape can be reduced, and automation of welding can be planned by reducing the Cr oxide generated on the molten pool surface during welding while stabilizing the arc.

DESCRIPTION OF EMBODIMENTS

Figure 1:
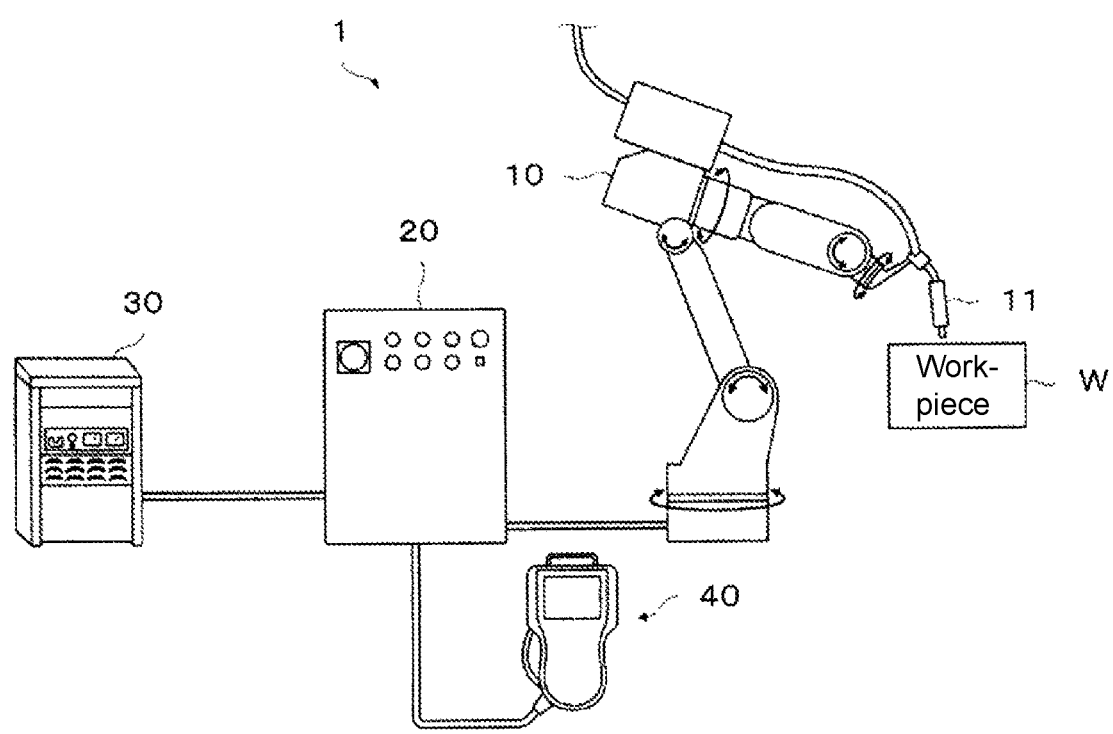
FIG. 1 is a diagram showing a schematic configuration of a welding system according to an embodiment of the present invention.

Hereinafter, modes (embodiments) for carrying out a gas shielded arc welding wire and a gas shielded arc welding method using the same in the present invention will be described.

In the present specification, the gas shielded arc welding wire may be simply referred to as a "welding wire" or a "wire". Hereinafter, "%" means "% by mass" unless otherwise specified. Further, "to" means that the value is equal to or greater than the lower limit value and equal to or smaller than the upper limit value.
<Welding Wire>

A form of the welding wire in the present invention is not particularly limited, and may be a solid wire or a flux-cored wire.

The solid wire is a wire having a wire shape in which a wire cross section is solid and homogenous. The solid wire has a form subjected to copper plating on its surface and a form not subjected to copper plating, but both forms may be used.

The flux-cored wire is composed of an outer sheath having a cylindrical shape and a flux filling the inside of the outer sheath. The flux-cored wire may be in a form of either a seamless one having no joint on the outer sheath or a seam one having a joint on the outer sheath. Further, the flux-cored welding wire may or may not be subjected to copper plating on the wire surface (an outer side of the outer sheath). The material of the outer sheath is not particularly limited, and may be mild steel or stainless steel, and there is no particular limit as long as the composition in a total weight of the welding wire is within a specified range.

Further, the welding wire in the present invention includes predetermined amounts of C, Si, Mn, Cr, Ni, Mo, V, Nb, REM, S, and O, and contents of Nb, REM, S, and O satisfy a predetermined relationship, respectively. If necessary, N, W, Co, Ta, B, and Cu are preferably contained, and the balance is preferably composed of Fe and inevitable impurities.

Hereinafter, a numerical range of an amount of each component of the welding wire will be described together with a reason for the limitation. The component amount is specified in proportion to the total mass of the wire. The flux-cored wire is expressed by a sum of component amounts of the outer sheath and the flux, and a mass of each component contained in the wire (outer sheath+flux) is specified by a ratio with respect to the total mass of the wire.
(C: 0.01% to 0.50%)

C forms a carbide and is an element necessary for securing creep strength of weld metal. C also functions as an element for stabilizing austenite and reduces remains of a δ-ferrite phase in the weld metal. However, in the case where a C content is less than 0.01%, carbide is not formed, sufficient creep strength is not secured, and toughness deteriorates. On the other hand, in the case where the C content exceeds 0.50%, susceptibility to a hot crack increases. Further, a precipitation amount of carbide increases, toughness deteriorates due to excessive strength, and creep strength is also poor. Therefore, the C content is specified in a range of 0.01% to 0.50%. A more preferable upper limit of the C content is 0.15%, and a more preferable lower limit of the C content is 0.04%.
(Si: 0.01% to 1.50%)

Si acts as a deoxidizing agent to reduce oxygen in the weld metal, thereby improving strength and toughness of the weld metal. However, in the case where a Si content is less than 0.01%, a deoxidizing effect becomes weak, and therefore the creep strength and toughness deteriorate, and a welding defect such as lack of fusion is likely to occur. On the other hand, in the case where the Si content exceeds 1.50%, a slag amount is excessive, which promotes occurrence of welding defects such as arc instability and slag entrainment during multi-layer welding. Further, toughness deteriorates due to excessive strength. Therefore, the Si content is specified in a range of 0.01% to 1.50%. A more preferable upper limit of the Si content is 0.80%, and a more preferable lower limit of the Si content is 0.01%.
(Mn: 0.10% to 2.50%)

Like Si, Mn acts as a deoxidizing agent to improve the strength and toughness of the weld metal. Further, Mn also functions as an element for stabilizing austenite and reduces remains of a δ-ferrite phase in the weld metal. However, in the case where the Mn content is less than 0.10%, the deoxidizing effect is weak, and therefore the toughness deteriorates. On the other hand, in the case where the Mn content exceeds 2.50%, a slag amount is excessive, which promotes occurrence of welding defects such as arc instability and slag entrainment during multi-layer welding. In addition, the carbide grows to be coarse and the creep strength deteriorates. Therefore, the Mn content is specified in a range of 0.10% to 2.50%. A more preferable upper limit of the Mn content is 1.80%, and a more preferable lower limit of the Mn content is 0.40%.

(Cr: 5% to 15%)

Cr is a main element essential for a heat-resistant steel welding wire used in an environment of high temperature and high pressure, and ensures oxidation resistance, corrosion resistance, and creep strength of the weld metal. However, in the case where the Cr content is less than 5%, the precipitation amount of the carbide decreases, and the creep strength deteriorates. On the other hand, in the case where the Cr content exceeds 15%, high temperature susceptible cracking is increased, and the creep strength and toughness deteriorate due to the excessive amount of δ-ferrite. Therefore, the Cr content is specified in a range of 5% to 15%. A more preferable upper limit of the Cr content is 12%, and a more preferable lower limit of the Cr content is 8%.

(Ni: 0.05% to 1.50%)

Ni functions as an element for stabilizing austenite and reduces remains of a δ-ferrite phase in the weld metal. However, in the case where the Ni content is less than 0.05%, remains of the δ-ferrite phase cannot be reduced, and the toughness deteriorates. On the other hand, in the case where the Ni content exceeds 1.50%, since an Ac1 transformation point of the weld metal decreases, temperature setting of a post weld heat treatment (PWHT) must be limited, and the carbide grows to be coarse such that the creep strength deteriorates. Therefore, the Ni content is specified in a range of 0.05% to 1.50%. A more preferable upper limit of the Ni content is 1.00%, and a more preferable lower limit of the Ni content is 0.05%.

(Mo: 0.1% to 2.0%)

Mo is an element for strengthening solid solution and is solved in the weld metal to improve the creep strength. However, in the case where a Mo content is less than 0.1%, an effect of improving the creep strength cannot be obtained. On the other hand, in the case where the Mo content exceeds 2.0%, since Mo is a ferrite generating element, the δ-ferrite phase remains and the toughness deteriorates. Therefore, the Mo content is specified in a range of 0.1% to 2.0%. A more preferable upper limit of the Mo content is 1.2%, and a more preferable lower limit of the Mo content is 0.2%.

(V: 0.10% to 1.00%)

V is an element for strengthening precipitation that generates a carbon nitride and improves the creep strength of the weld metal. However, in the case where a V content is less than 0.10%, an effect of improving the creep strength cannot be obtained. On the other hand, in the case where the V content exceeds 1.00%, excessive strength due to excessive precipitates causes deterioration of toughness and deterioration of creep performance due to coarsening of the carbon nitride. Therefore, the V content is specified in a range of 0.10% to 1.00%. A more preferable upper limit of the V content is 0.25%, and a more preferable lower limit of the V content is 0.15%.

(Nb: 0.01% to 0.20%)
(REM: 0.001% to 0.050%)
(S: 0.001% to 0.020%)
(O: 0.025% or Less (Including 0%))

As described above, Cr is a main element essential in a welding wire for heat-resistant steel used in an environment of high temperature and high pressure, but in the case where Cr is contained in the specified range of the present embodiment that is optimum in view of the creep strength or toughness of the weld metal, a firm Cr oxide is formed on a molten pool surface or an edge of a molten pool during welding. The Cr oxide inhibits the flow of molten metal in the molten pool and causes a welding defect such as lack of fusion. The flow of molten metal in the molten pool is inhibited because a melting point of $Cr_2O_3$, which is a Cr oxide having a relatively high affinity with oxygen, is as high as 2334° C., and an oxide film is formed on the molten pool surface. In order to prevent the oxide film, it is effective to add an element which has a higher affinity with oxygen than Cr and oxides of which have a low melting point.

The present inventors have found Nb as an element that satisfies these characteristics. Nb has a higher affinity with oxygen than Cr, and a melting point of an oxide $Nb_2O_5$ is 1490° C., which is lower than a melting point of iron (1538° C.). Thus, by adding an appropriate amount of Nb into the welding wire, generation of the Cr oxide is reduced, and as a result, the flow of molten metal in the molten pool is improved. In order to exert the effect of reducing the Cr oxide, an addition amount of Nb needs to be 0.01% or more. On the other hand, Nb has an effect of forming a carbide or a nitride during PWHT and increasing creep strength of deposited metal. Meanwhile, if Nb is excessively added, a precipitation amount of the carbide or the nitride increases and toughness deterioration due to the excessive strength of the weld metal occurs, such that the addition amount of Nb needs to be reduced to 0.20% or less. In addition, excessive addition of Nb forms a low melting point compound at a grain boundary, and a hot crack is likely to occur. Therefore, a Nb content is specified in a range of 0.01% to 0.20%.

However, although the flow of molten metal in the molten pool can be improved by adding an appropriate amount of Nb, there is a new problem that arc instability occurs only by simply adding Nb. In the arc, although an oxide on the molten pool acts as a cathode point and stabilizes the arc, the Cr oxide is reduced by adding Nb, such that a cathode point is not supplied stably, and as a result, the arc becomes unstable and welding workability deteriorates. In particular, in welding of power boiler equipment, in order to ensure the toughness, since it is necessary to reduce an amount of oxygen as much as possible by using an inert gas such as Ar or He, the problem of arc instability becomes more significant.

As a method of stabilizing an arc in a low oxygen atmosphere, addition of REM is cited as a related example. A reason thereof is that the cathode point is stable because of characteristics that the REM has a high affinity with oxygen (for example, Ce has a higher affinity than Cr and Nb) and a REM oxide generated has a low work function. However, in the case where Nb is added, the REM oxide generated on the molten pool surface tends to flow toward the edge of the molten pool since the flow of molten metal in the molten pool is improved, and the arc is deflected toward the edge of the molten pool (that is, the arc becomes unstable). One of the factors of this is that a generation amount of the REM oxide to be generated is small due to the low oxygen atmosphere. Therefore, in order to stabilize the arc by addition of the REM while adding Nb, the cathode point must be stably supplied while the amount of oxygen is limited.

In the present embodiment, in order to stabilize the arc, an appropriate amount of S is added other than the REM. In the related art, it is considered that in the case where S is excessively contained, a low melting point compound is formed and susceptibility to weld cracking is increased, such that it is necessary to reduce the amount of S as low as possible. However, the REM has a high affinity with S as well as O and is likely to be generated as a sulfide. The sulfide has a slightly higher work function than the oxide but the work function is sufficiently low to act as the cathode point, and the sulfide greatly contributes to arc stabilization in a low oxygen atmosphere. Regarding the work function of the REM sulfide, for example, in a case of Ce, a work function of CeS is 3.9 eV, and a work function of an oxide $Ce_2O_3$ is 3.2 eV. Although the sulfide has a slightly higher work function as described above, there is no significant difference in arc stabilization, and the sulfide sufficiently acts on arc stabilization.

As described above, it is possible to achieve improvement of the flow of molten metal while maintaining arc stabilization by adding an appropriate amount of Nb, REM, and S, under a basic premise that 0 is reduced as much as possible. Since the O content in the welding wire is preferably low in view of toughness or molten metal flow, a lower limit thereof is not particularly limited (namely, including 0%). On the other hand, in the case where the O content exceeds 0.025% and is excessively present, a Cr oxide is generated to inhibit the flow of molten metal in the molten pool, and a welding defect occurs. Further, since the generated oxide is a starting point of brittle fracture and the toughness deteriorates, O is specified to 0.025% or less.

REM needs to be 0.001% or more and S needs to be 0.001% or more for arc stabilization. On the other hand, in the case where REM is excessively added, a REM oxide is excessively generated, which may cause deterioration of toughness, and thus REM is 0.050% or less. In addition, in the case where S is excessively added, the susceptibility to weld cracking may be increased, and thus S is 0.020% or less. Therefore, the content of REM is preferably specified in the range of 0.001% to 0.050%, and is more preferably in a range of 0.010% to 0.040% in view of arc stabilization. The content of S is preferably specified in the range of 0.001% to 0.020%, and is more preferably in a range of 0.002% to 0.020% in view of arc stabilization.

The form of adding REM is not particularly limited, and in the case of flux-cored wire, REM may be added into a flux, or may be added to a steel skin (hoop) or a steel skin surface. In addition, in the case of a solid wire, REM may be added to steel or a steel surface. However, in view of arc stability, a method of adding REM into the flux in the flux-cored wire is most preferable.

Further, Nb, REM, S, and O need to satisfy the following relationship (1) in addition to the above specified ranges. Nb, REM, S, and O in the relationship (1) are respective contents (mass %) based on total mass of the wire, but their units are omitted. The same applies to relationship (2) to relationship (5) to be described later.

$$3.0 \leq (Nb+10 \times REM)/(S+O) \leq 200.0 \quad (1)$$

In the case where a value (parameter) of relationship (1) is less than 3.0, an addition amount of S and O is excessively large with respect to Nb and REM, such that the flow of molten metal in the molten pool deteriorates, and arc destabilization or toughness deterioration occurs. On the other hand, in the case where the value exceeds 200.0, an addition amount of Nb and REM is excessively large with respect to S and O, such that the toughness deteriorates due to generation of an Nb carbide or excessive generation of a REM oxide. Therefore, the value of relationship (1) is specified in a range of 3.0 to 200.0.

A ratio of the addition amount of Nb and REM: Nb (mass %)/REM (mass %) preferably satisfies the following relationship (2) as the most effective range in view of both improvement of the molten metal flow and arc stabilization.

$$1.0 \leq Nb/REM \leq 80.0 \quad (2)$$

A more preferable upper limit of Nb/REM is 12.0, and a more preferable lower limit of Nb/REM is 1.5.

The element of REM specified in the present embodiment is not particularly limited. For example, only one kind of elements such as Sc, Y, La, Ce, Pr, and Nd may be selected, or two or more kinds may be combined, but considering that a work function of sulfides is low and almost the same as a value of a work function of oxides, La and Ce are preferably selected. In order to make the arc more stable than experimental knowledge, a ratio of La to Ce: La (mass %)/Ce (mass %) preferably satisfies the following relationship (3).

$$0.2 \leq La/Ce \leq 1.1 \quad (3)$$

A more preferable upper limit of La/Ce is 1.0, and a more preferable lower limit of La/Ce is 0.4.

Further, in order to reduce the oxide and stably generate a sulfide of REM, a ratio of O to S: O (mass %)/S (mass %) preferably satisfies the following relationship (4), and a relationship between REM and S and O: REM (mass %)/(S+O (mass %)) preferably satisfies the following relationship (5).

$$0.10 \leq O/S \leq 4.00 \quad (4)$$

$$0.30 \leq REM/(S+O) \leq 6.50 \quad (5)$$

A more preferable upper limit of O/S is 3.00, and a more preferable lower limit of O/S is 0.20. A more preferable upper limit of REM/(S+O) is 5.00, and a more preferable lower limit of REM/(S+O) is 1.00.

In the present embodiment, N, W, Co, Ta, B, and Cu may be added in an appropriate amount.

N bonds to Nb or V and is precipitated as a nitride, thereby improving the creep strength. A preferable addition amount of N to anticipate improvement of the creep strength is in a range of 0.01% or more and 0.10% or less. A more preferable upper limit of the addition amount of N is 0.08%, and a more preferable lower limit of the addition amount of N is 0.01%.

W is an element for strengthening solid solution, and the strength of the weld metal is improved. Since W is added to adjust the strength of the weld metal, a lower limit is not particularly specified (including 0%), but W is preferably reduced to 3.0% or less, more preferably 2.5% or less to ensure the toughness and strength.

Co has an effect of reducing generation of the δ-ferrite and improving the creep strength. A lower limit is not particularly specified (including 0%) since Co may be added as necessary. On the other hand, in order to improve the creep strength while reducing deterioration of toughness, in terms of an upper limit, Co is preferably reduced to 3.0% or less, more preferably 2.5% or less.

Ta has an effect of improving the creep strength by generating a carbide. A lower limit is not particularly specified (including 0%) since Ta may be added as necessary. On the other hand, in order to improve the creep strength while reducing deterioration of toughness, in terms of an upper limit, Ta is preferably reduced to 0.5% or less.

B has an effect of preventing carbide coarsening in grain boundaries and improving the creep strength. A lower limit is not particularly specified (including 0%) since B may be added as necessary. On the other hand, in order to improve the creep strength while reducing deterioration of toughness, in terms of an upper limit, B is preferably reduced to 0.005% or less.

Cu functions as an element for stabilizing austenite and has an effect of reducing remains of a δ-ferrite phase in the weld metal. A lower limit is not particularly specified (including 0%) since Cu may be added as necessary. On the other hand, in order to improve the creep strength while reducing deterioration of toughness, in terms of an upper limit, Cu is preferably reduced to 2.0% or less. Cu may be added into the wire or may be added as a form of Cu plating.

Further, in the welding wire of the present invention, as necessary, the balance is preferably Fe and inevitable impurities while adding N, W, Co, Ta, B, and Cu in the above range. The inevitable impurities are inevitably mixed during smelting and can be contained in a range that does not impair characteristics of the welding wire. Examples of the inevitable impurities include P, Sn, Sb, Ti, Al, and Zr. As allowable amounts allowed to be contained as inevitable impurities, specifically, P is less than 0.005%, Sn is less than 0.003%, Sb is less than 0.003%, Ti is less than 0.01%, Al is less than 0.01%, and Zr is less than 0.01%. In the present embodiment, as long as in a range that does not impair the effect of the present embodiment, the elements of the inevitable impurities described above may be intentionally contained, and elements other than the inevitable impurities may be intentionally contained.

Further, a diameter of the welding wire of the present embodiment is preferably in a range of 0.9 mm to 1.6 mm. As long as the diameter of the wire is 0.9 mm or more, a high welding current can flow, and an arc force can be increased. As a result, the arc directivity increases, which increases the arc stability. On the other hand, as long as the diameter of the wire is 1.6 mm or less, a droplet is more likely to separate by a pinch force, such that droplet transfer is stable and welding workability is good. A more preferable upper limit of the wire diameter is 1.4 mm, and a more preferable lower limit of the wire diameter is 1.0 mm.

<Gas Shielded Arc Welding Method>

Next, a gas shielded arc welding method using the welding wire of the present invention will be described. The present invention is not limited to an embodiment to be described below. The gas shielded arc welding method according to the present embodiment is a method of feeding the welding wire via a welding torch and performing welding while a shielding gas flows, in which welding automatically continues by a welding system (welding apparatus) as shown in FIG. 1.

(Welding System)

A configuration of the welding system for use in the gas shielded arc welding method according to the present embodiment is not particularly limited, and a welding system used for gas shielded arc welding in the related art can be used. For example, as shown in FIG. 1, a welding system 1 includes: a robot 10 including a welding torch 11 attached to the tip of the robot 10 and being configured to move the welding torch 11 along a welding line of a workpiece W; a wire supply unit (not shown) configured to feed a welding wire to the welding torch 11; and a welding power supply unit 30 configured to supply a current to the welding wire and generate an arc between the welding wire and the workpiece. In addition, the welding system 1 includes: a robot control unit 20 configured to control a robot operation for moving the welding torch 11; and a teaching device 40 connected to the robot control unit 20 to output a command to the robot 10 to the robot control unit 20.

(Shielding Gas)

The shielding gas used in the gas shielded arc welding method according to the present embodiment is not particularly limited, and Ar gas, He gas, carbon dioxide gas (carbon dioxide: $CO_2$), oxygen gas ($O_2$), and a mixed gas thereof can be used. These may include $N_2$, $H_2$, and the like as impurities. Among them, it can be said that application of Ar gas, Ar-containing mixed gas, He gas and He-containing mixed gas as the shielding gas is preferable because an amount of oxygen in the molten metal can be further reduced. In the case where the Ar-containing mixed gas or the He-containing mixed gas is used as the shielding gas, it is more preferable that the Ar gas or the He gas is contained in 90 volume % or more. Further, it is most preferable to use 100 volume % Ar gas or 100 volume % He gas (including inevitable impurities).

Further, in view of welding workability and ensuring penetration, it is preferable to make polarity of the welding wire side negative by using a gas of 100 volume % of $CO_2$ or a mixed gas in which the content of $CO_2$ is 90 volume % or more as the shielding gas according to the present embodiment.

A flow rate of the shielding gas is preferably 30 L/min or less and 10 L/min or more. By specifying in this range, the gas flowing out becomes a laminar flow, which is suitable for preventing air inclusion.

(Current Control)

The welding power supply unit 30 may be a power supply for a direct current or a power supply for an alternating current, and the form of the power supply is not particularly limited. A command for controlling a waveform of the current may be a straight line, or may be performed in a pulse waveform such as a rectangle or a triangle. The polarity may be electrode negative (EN) or electrode positive (EP).

EXAMPLES

Hereinafter, the present invention will be described in more detail with reference to Examples, but the present invention is not limited to these Examples, and can be carried out with changes as long as applicable to the spirit of the present invention, and all of which are included in the technical scope of the present invention.

A welding wire used in the Example is shown in Tables 1 to 4. The welding wire was used to perform welding under the following welding conditions (wire diameter, welding current, arc voltage, and welding speed are fixed in all Examples and Comparative Examples). The welding conditions described here are an example, and the welding condition of the present embodiment is not limited to the following welding conditions. In Tables 5 to 9, evaluation results of arc stability, bead appearance, welding defects (lack of fusion, slag inclusion, blowhole, and the like), hot cracking resistance, toughness, and creep strength are shown.

<Welding Conditions>

Wire diameter: 1.2 mm
Welding current: 280 A
Arc voltage: 30 V
Welding speed: 30 cm/min
Other conditions are described in Tables 1 to 4 and Tables 5 to 9.

In Tables 1 to 4, an expression "-" in each component composition means that it is less than a detection limit in composition analysis.

Figure 2:
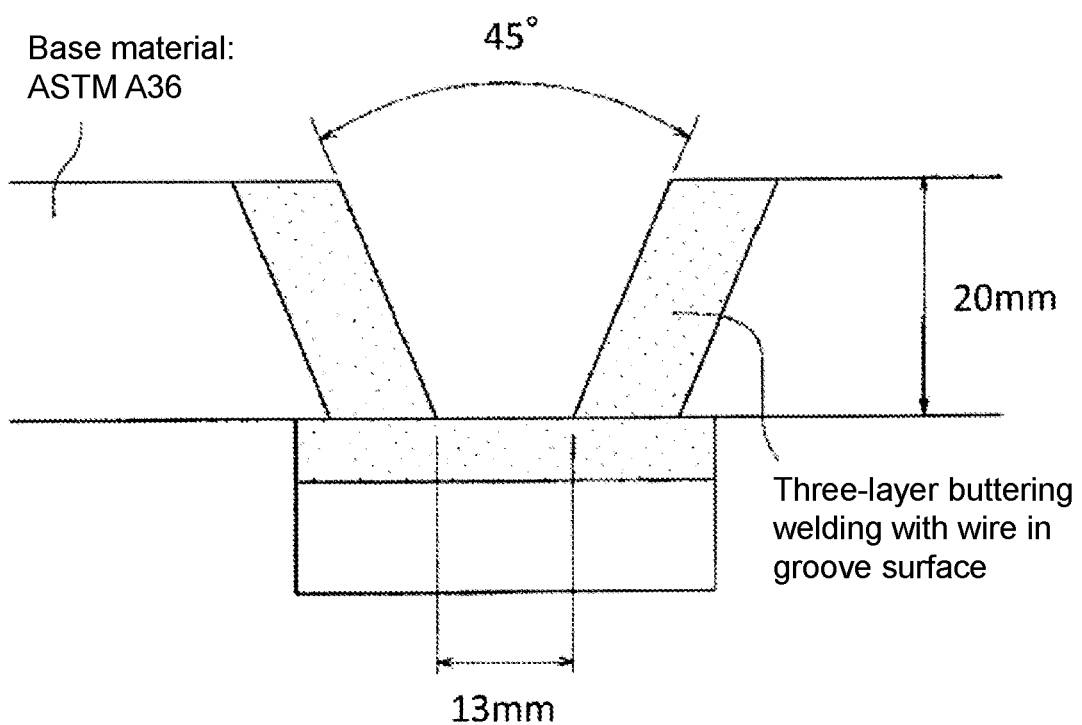
FIG. 2 is a schematic view showing a groove shape of a welding test plate in Examples.

ASTM A36 steel was used as a base metal under test to obtain a groove shape shown in FIG. 2. In addition, a groove surface was buttered on the basis of welding conditions shown in Table 10 by using the wire having chemical composition shown in Table 1. After welding, PWHT was performed at a temperature of 740° C. for 4 hours.

<Evaluation Method>

(Arc Stability)

Regarding the arc stability during welding, a variation in arc length was determined from visual observation using a light shielding surface and a video captured by a high-speed video camera. The number of times of arc deflection was visually counted in the video of the high-speed video camera captured at 1000 fps for 30 seconds. Evaluation: "A" (excellent) indicates that the number of times of arc deflection is less than 10; Evaluation: "B" (good) indicates that the variation value is 10 times or more and less than 30 times; Evaluation: "C" (bad) indicates that the variation value is 30 times or more, and the variation in arc length is as large as that the arc instability can be confirmed by visual observation using a light shielding surface.

(Bead Appearance)

A bead surface having welding defects such as meandering, humping, and undercut of the beads after welding was visually determined. A case where any one of these welding defects was confirmed was determined as evaluation: "x" (bad), and a case where no welding defect was confirmed was determined as evaluation: "○" (good).

(Welding Defects (Lack of Fusion, Slag Inclusion, Blowhole, and the Like))

Welding defects such as lack of fusion, slag inclusion, and blowhole after multi-layer welding were determined by a radiation transmission test. The radiation transmission test was based on ASTM E1032, and the determination criteria followed ASME SFA-5.28 ("11. Radiographic Test"). In the radiation transmission test, welding defects that satisfy the determination criteria of ASME SFA-5.28 were determined as evaluation: "○" (pass), and welding defects that do not satisfy the determination criteria were determined as evaluation: "x" (failed).

(Hot Cracking Resistance)

Figure 3A:
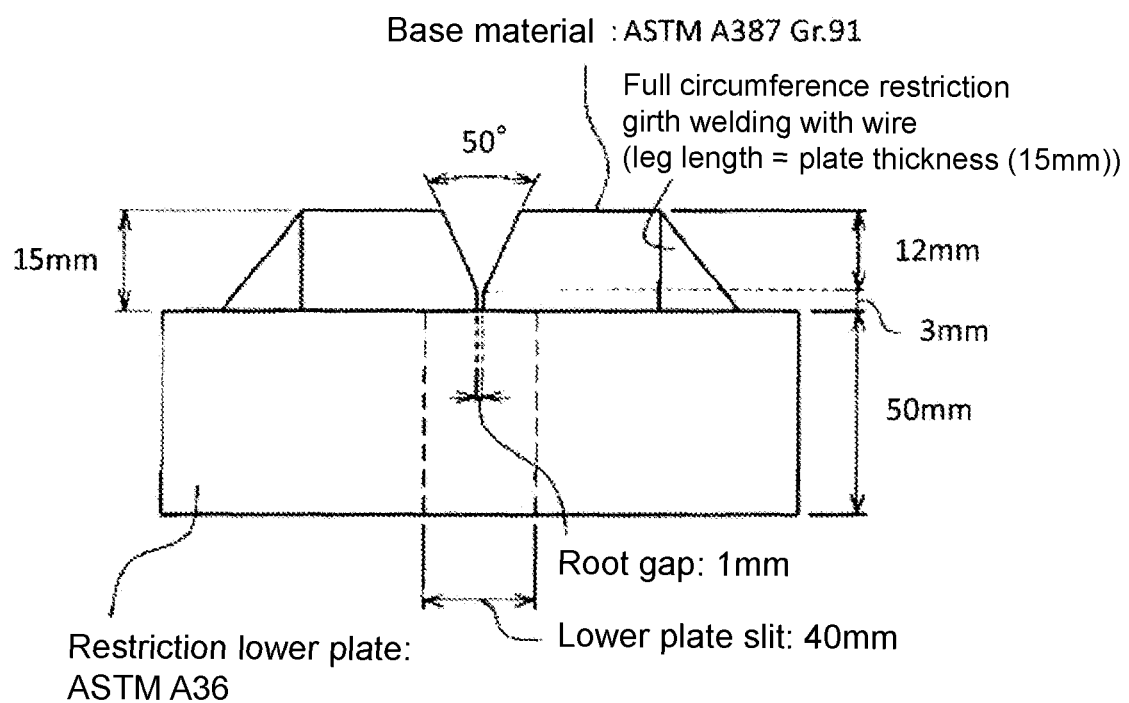
FIG. 3A is a schematic view (front view) showing a groove shape of a welding test plate for evaluating hot cracking resistance.
Figure 3B:
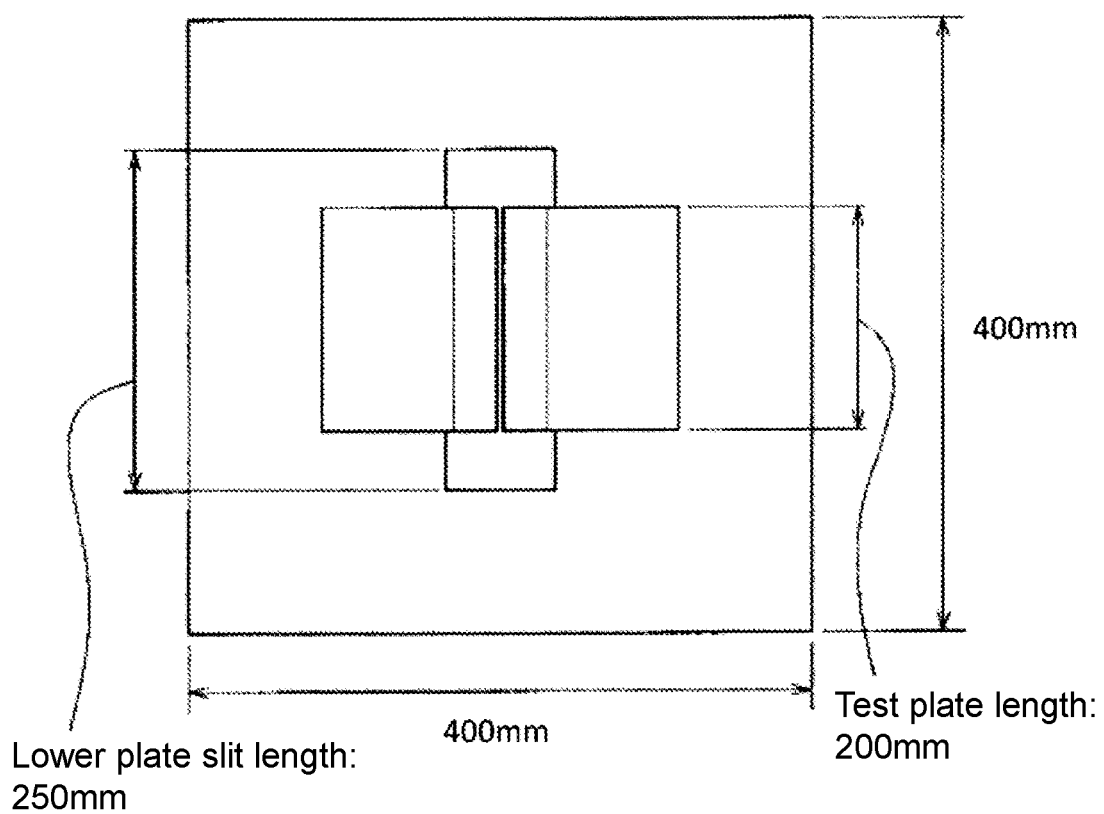
FIG. 3B is a schematic view (plan view) showing the groove shape of the welding test plate for evaluating hot cracking resistance.

The hot cracking resistance of each wire was evaluated as follows. Since a welding bead surface and an internal hot crack are likely to cause a problem in GMAW, a single pass welding that simulated GMAW in a pipe groove was performed using a test plate having a groove shape shown in FIG. 3A and FIG. 3B. Then, an appearance test and a liquid penetrant test were performed to confirm the presence or absence of a hot crack on the welding bead surface. The liquid penetrant test was performed in accordance with JIS Z2343-1. In the appearance test and the liquid penetrant test, hot cracking resistance with no defect was determined as evaluation: "○" (pass), and hot cracking resistance with a defect was determined as evaluation: "x" (failed), respectively.

(Toughness)

Figure 4:
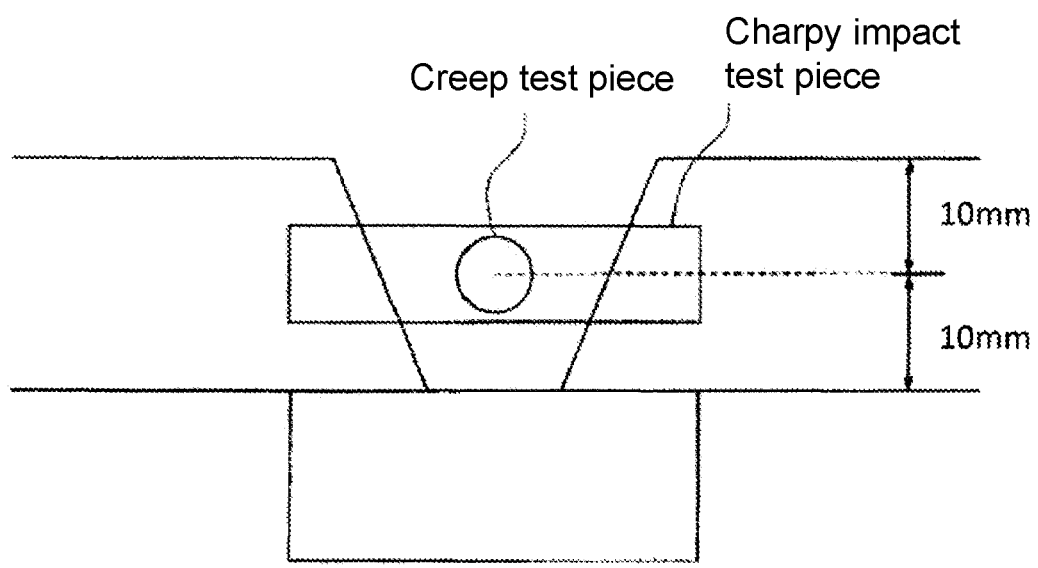
FIG. 4 is a schematic view showing positions for picking a Charpy impact test piece and a creep test piece.

Toughness of whole deposited metal was evaluated by a Charpy impact test. In the evaluation of the toughness of the whole deposited metal, a 10 mm-square Charpy impact test piece having a 2 mm-V notch (side notch) in accordance with AWS B4.0 in normal direction (joint direction) of a weld line from a central part of plate thickness of the deposited metal after PWHT was provided. The test temperature was 20° C., and the number of test was three and the average value thereof was determined. FIG. 4 shows positions for picking a Charpy impact test piece and a creep test piece. Regarding the toughness of the whole deposited metal, a case where an average of three points of absorbed energy (vE+20° C.) in the Charpy impact test at 20° C. was 65 J or more was determined as evaluation: "A" (pass), a case where the average of three pints of absorbed energy was 45 J or more and less than 65 J was determined as evaluation: "B" (pass), and a case where the average of three points of absorbed energy was less than 45 J was determined as evaluation: "C" (failed).

(Creep Strength)

A creep test was performed to evaluate creep strength of the whole deposited metal. In the evaluation of the creep strength of the whole deposited metal, a creep test piece (test piece diameter: φ6.0 mm, parallel portion length: 30.0 mm, dumbbell shape) in the weld line direction from the center part of plate thickness of the deposited metal was provided. In the creep test, a test temperature was 650° C. and an initial load stress was 100 MPa, and a case where a creep fracture time of 900 h or more was determined as evaluation: "A" (pass), a case where the creep strength having a creep fracture time of 700 h or more and less than 900 h was determined as evaluation: "B" (pass), and a case where the creep strength having a creep fracture time of less than 700 h was determined as evaluation: "C" (failed).

TABLE 1

| Wire No. | Wire type | Wire composition (mass %, balance Fe and inevitable impurities) | | | | | | | | | |
|---|---|---|---|---|---|---|---|---|---|---|---|
| | | C | Si | Mn | Cr | Ni | Mo | V | Nb | S | O |
| w1 | FCW | 0.080 | 0.450 | 1.60 | 9.5 | 0.70 | 1.00 | 0.20 | 0.080 | 0.0090 | 0.0050 |
| w2 | FCW | 0.070 | 0.400 | 1.75 | 9.2 | 0.70 | 0.90 | 0.25 | 0.020 | 0.0070 | 0.0030 |
| w3 | FCW | 0.070 | 0.430 | 1.65 | 9.4 | 0.90 | 0.20 | 0.070 | 0.0090 | 0.0010 |
| w4 | FCW | 0.080 | 0.450 | 1.60 | 9.5 | 0.70 | 1.00 | 0.20 | 0.070 | 0.0010 | 0.0040 |
| w5 | FCW | 0.090 | 0.450 | 1.60 | 9.2 | 0.75 | 1.00 | 0.22 | 0.070 | 0.0020 | 0.0050 |
| w6 | FCW | 0.090 | 0.420 | 1.60 | 9.0 | 0.72 | 0.92 | 0.22 | 0.070 | 0.0150 | 0.0060 |
| w7 | FCW | 0.080 | 0.450 | 1.60 | 9.5 | 0.72 | 1.00 | 0.20 | 0.080 | 0.0160 | 0.0050 |
| w8 | FCW | 0.070 | 0.440 | 1.60 | 9.4 | 0.71 | 1.00 | 0.20 | 0.080 | 0.0200 | 0.0060 |
| w9 | FCW | 0.080 | 0.440 | 1.65 | 9.5 | 0.70 | 1.00 | 0.20 | 0.200 | 0.0080 | 0.0050 |
| w10 | FCW | 0.080 | 0.430 | 1.60 | 9.5 | 0.70 | 1.00 | 0.20 | 0.070 | 0.0100 | 0.0250 |
| w11 | FCW | 0.080 | 0.450 | 1.62 | 9.5 | 0.70 | 1.00 | 0.20 | 0.070 | 0.0070 | 0.0050 |
| w12 | FCW | 0.080 | 0.450 | 1.60 | 9.5 | 0.70 | 1.00 | 0.18 | 0.080 | 0.0070 | 0.0040 |
| w13 | FCW | 0.070 | 0.440 | 1.60 | 9.4 | 0.71 | 1.00 | 0.20 | 0.070 | 0.0090 | 0.0050 |
| w14 | FCW | 0.080 | 0.450 | 1.60 | 9.2 | 0.70 | 0.92 | 0.20 | 0.070 | 0.0070 | 0.0050 |
| w15 | FCW | 0.070 | 0.440 | 1.60 | 9.4 | 0.71 | 1.00 | 0.22 | 0.080 | 0.0080 | 0.0040 |
| w16 | FCW | 0.070 | 0.440 | 1.60 | 9.4 | 0.71 | 1.00 | 0.18 | 0.080 | 0.0070 | 0.0050 |
| w17 | FCW | 0.490 | 0.450 | 1.60 | 9.2 | 0.70 | 0.90 | 0.20 | 0.070 | 0.0080 | 0.0050 |

TABLE 1-continued

| Wire No. | \multicolumn{5}{c}{Wire composition (mass %, balance Fe and inevitable impurities)} | | | | | |
|---|---|---|---|---|---|---|---|---|---|---|
| | \multicolumn{5}{c}{REM} | N | W | Co | Ta | B | Cu |
| | La | Ce | Sc | Y | Total | | | | | | |
| w1 | 0.0120 | 0.0200 | — | — | 0.0320 | 0.03 | — | — | — | — | — |
| w2 | 0.0120 | 0.0190 | — | — | 0.0310 | 0.03 | — | — | — | — | — |
| w3 | 0.0110 | 0.0200 | — | — | 0.0310 | 0.04 | — | — | — | — | — |
| w4 | 0.0120 | 0.0200 | — | — | 0.0320 | 0.03 | — | — | — | — | — |
| w5 | 0.0120 | 0.0180 | — | — | 0.0300 | 0.03 | — | — | — | — | — |
| w6 | 0.0110 | 0.0170 | — | — | 0.0280 | 0.03 | — | — | — | — | — |
| w7 | 0.0120 | 0.0180 | — | — | 0.0300 | 0.04 | — | — | — | — | — |
| w8 | 0.0110 | 0.0190 | — | — | 0.0300 | 0.03 | — | — | — | — | — |
| w9 | 0.0120 | 0.0190 | — | — | 0.0310 | 0.03 | — | — | — | — | — |
| w10 | 0.0120 | 0.0180 | — | — | 0.0300 | 0.03 | — | — | — | — | — |
| w11 | 0.0003 | 0.0008 | — | — | 0.0011 | 0.04 | — | — | — | — | — |
| w12 | 0.0050 | 0.0050 | — | — | 0.0100 | 0.03 | — | — | — | — | — |
| w13 | 0.0030 | 0.0050 | — | — | 0.0080 | 0.03 | — | — | — | — | — |
| w14 | 0.0240 | 0.0260 | — | — | 0.0500 | 0.03 | — | — | — | — | — |
| w15 | 0.0190 | 0.0210 | — | — | 0.0400 | 0.03 | — | — | — | — | — |
| w16 | 0.0180 | 0.0240 | — | — | 0.0420 | 0.03 | — | — | — | — | — |
| w17 | 0.0110 | 0.0170 | — | — | 0.0280 | 0.03 | — | — | — | — | — |

| Wire No. | Relationship (1) | Relationship (2) | Relationship (3) | Relationship (4) | Relationship (5) | Addition place of REM |
|---|---|---|---|---|---|---|
| w1 | 28.6 | 2.5 | 0.6 | 0.56 | 2.29 | In flux |
| w2 | 33.0 | 0.6 | 0.6 | 0.43 | 3.10 | In flux |
| w3 | 38.0 | 2.3 | 0.6 | 0.11 | 3.10 | In flux |
| w4 | 78.0 | 2.2 | 0.6 | 4.00 | 6.40 | In flux |
| w5 | 52.9 | 2.3 | 0.7 | 2.50 | 4.29 | In flux |
| w6 | 16.7 | 2.5 | 0.6 | 0.40 | 1.33 | In flux |
| w7 | 18.1 | 2.7 | 0.7 | 0.31 | 1.43 | In flux |
| w8 | 14.6 | 2.7 | 0.6 | 0.30 | 1.15 | In flux |
| w9 | 39.2 | 6.5 | 0.6 | 0.63 | 2.38 | In flux |
| w10 | 10.6 | 2.3 | 0.7 | 2.50 | 0.86 | In flux |
| w11 | 6.8 | 63.6 | 0.4 | 0.71 | 0.09 | In flux |
| w12 | 16.4 | 8.0 | 1.0 | 0.57 | 0.91 | In flux |
| w13 | 10.7 | 8.8 | 0.6 | 0.56 | 0.57 | In flux |
| w14 | 47.5 | 1.4 | 0.9 | 0.71 | 4.17 | In flux |
| w15 | 40.0 | 2.0 | 0.9 | 0.50 | 3.33 | In flux |
| w16 | 41.7 | 1.9 | 0.8 | 0.71 | 3.50 | In flux |
| w17 | 26.9 | 2.5 | 0.6 | 0.63 | 2.15 | In flux |

| Wire No. | Wire type | \multicolumn{9}{c}{Wire composition (mass %, balance Fe and inevitable impurities)} | | | | | | | | |
|---|---|---|---|---|---|---|---|---|---|---|---|
| | | C | Si | Mn | Cr | Ni | Mo | V | Nb | S | O |
| w18 | FCW | 0.010 | 0.430 | 1.60 | 9.4 | 0.72 | 0.90 | 0.20 | 0.070 | 0.0080 | 0.0040 |
| w19 | FCW | 0.070 | 0.440 | 2.50 | 9.4 | 0.71 | 1.00 | 0.20 | 0.070 | 0.0070 | 0.0050 |
| w20 | FCW | 0.090 | 0.420 | 0.11 | 9.0 | 0.72 | 0.92 | 0.20 | 0.070 | 0.0080 | 0.0050 |
| w21 | FCW | 0.070 | 0.440 | 1.60 | 15.0 | 0.75 | 1.00 | 0.22 | 0.080 | 0.0080 | 0.0040 |
| w22 | FCW | 0.070 | 0.420 | 1.60 | 5.1 | 0.71 | 1.00 | 0.15 | 0.080 | 0.0070 | 0.0040 |
| w23 | FCW | 0.070 | 0.010 | 1.60 | 9.2 | 0.72 | 1.00 | 0.20 | 0.080 | 0.0070 | 0.0050 |
| w24 | FCW | 0.080 | 1.480 | 1.60 | 9.4 | 0.71 | 1.00 | 0.20 | 0.070 | 0.0080 | 0.0050 |
| w25 | FCW | 0.070 | 0.450 | 1.60 | 9.4 | 0.71 | 2.00 | 0.20 | 0.070 | 0.0070 | 0.0040 |
| w26 | FCW | 0.070 | 0.440 | 1.60 | 9.4 | 0.70 | 0.10 | 0.20 | 0.080 | 0.0070 | 0.0050 |
| w27 | FCW | 0.080 | 0.450 | 1.62 | 9.2 | 0.70 | 0.92 | 0.18 | 0.010 | 0.0070 | 0.0040 |
| w28 | FCW | 0.070 | 0.440 | 1.60 | 9.5 | 0.05 | 1.00 | 0.20 | 0.070 | 0.0070 | 0.0050 |
| w29 | FCW | 0.080 | 0.420 | 1.62 | 9.4 | 1.50 | 0.90 | 0.22 | 0.070 | 0.0080 | 0.0050 |
| w30 | FCW | 0.090 | 0.450 | 1.60 | 9.4 | 0.70 | 0.90 | 0.10 | 0.080 | 0.0080 | 0.0040 |
| w31 | FCW | 0.070 | 0.440 | 1.60 | 9.4 | 0.72 | 1.00 | 1.00 | 0.080 | 0.0070 | 0.0050 |
| w32 | FCW | 0.070 | 0.440 | 1.61 | 9.4 | 0.70 | 0.90 | 0.20 | 0.150 | 0.0020 | 0.0010 |
| w33 | FCW | 0.080 | 0.420 | 1.60 | 9.2 | 0.72 | 1.00 | 0.20 | 0.020 | 0.0180 | 0.0200 |

| Wire No. | \multicolumn{5}{c}{Wire composition (mass %, balance Fe and inevitable impurities)} | | | | | |
|---|---|---|---|---|---|---|---|---|---|---|
| | \multicolumn{5}{c}{REM} | N | W | Co | Ta | B | Cu |
| | La | Ce | Sc | Y | Total | | | | | | |
| w18 | 0.0110 | 0.0200 | — | — | 0.0310 | 0.03 | — | — | — | — | — |
| w19 | 0.0120 | 0.0180 | — | — | 0.0300 | 0.04 | — | — | — | — | — |
| w20 | 0.0110 | 0.0200 | — | — | 0.0310 | 0.03 | — | — | — | — | — |
| w21 | 0.0110 | 0.0200 | — | — | 0.0310 | 0.03 | — | — | — | — | — |
| w22 | 0.0120 | 0.0200 | — | — | 0.0320 | 0.03 | — | — | — | — | — |
| w23 | 0.0120 | 0.0200 | — | — | 0.0320 | 0.03 | — | — | — | — | — |
| w24 | 0.0120 | 0.0190 | — | — | 0.0310 | 0.03 | — | — | — | — | — |
| w25 | 0.0120 | 0.0180 | — | — | 0.0300 | 0.03 | — | — | — | — | — |

TABLE 1-continued

| | | | | | | | | | | |
|---|---|---|---|---|---|---|---|---|---|---|
| w26 | 0.0120 | 0.0200 | — | — | 0.0320 | 0.03 | — | — | — | — — |
| w27 | 0.0120 | 0.0180 | — | — | 0.0300 | 0.03 | — | — | — | — — |
| w28 | 0.0120 | 0.0180 | — | — | 0.0300 | 0.03 | — | — | — | — — |
| w29 | 0.0110 | 0.0200 | — | — | 0.0310 | 0.03 | — | — | — | — — |
| w30 | 0.0120 | 0.0180 | — | — | 0.0300 | 0.03 | — | — | — | — — |
| w31 | 0.0120 | 0.0200 | — | — | 0.0320 | 0.03 | — | — | — | — — |
| w32 | 0.0190 | 0.0250 | — | — | 0.0440 | 0.03 | — | — | — | — — |
| w33 | 0.0030 | 0.0080 | — | — | 0.0110 | 0.03 | — | — | — | — — |

| Wire No. | Relationship (1) | Relationship (2) | Relationship (3) | Relationship (4) | Relationship (5) | Addition place of REM |
|---|---|---|---|---|---|---|
| w18 | 31.7 | 2.3 | 0.6 | 0.50 | 2.58 | In flux |
| w19 | 30.8 | 2.3 | 0.7 | 0.71 | 2.50 | In flux |
| w20 | 29.2 | 2.3 | 0.6 | 0.63 | 2.38 | In flux |
| w21 | 32.5 | 2.6 | 0.6 | 0.50 | 2.58 | In flux |
| w22 | 36.4 | 2.5 | 0.6 | 0.57 | 2.91 | In flux |
| w23 | 33.3 | 2.5 | 0.6 | 0.71 | 2.67 | In flux |
| w24 | 29.2 | 2.3 | 0.6 | 0.63 | 2.38 | In flux |
| w25 | 33.6 | 2.3 | 0.7 | 0.57 | 2.73 | In flux |
| w26 | 33.3 | 2.5 | 0.6 | 0.71 | 2.67 | In flux |
| w27 | 28.2 | 0.3 | 0.7 | 0.57 | 2.73 | In flux |
| w28 | 30.8 | 2.3 | 0.7 | 0.71 | 2.50 | In flux |
| w29 | 29.2 | 2.3 | 0.6 | 0.63 | 2.38 | In flux |
| w30 | 31.7 | 2.7 | 0.7 | 0.50 | 2.50 | In flux |
| w31 | 33.3 | 2.5 | 0.6 | 0.71 | 2.67 | In flux |
| w32 | 196.7 | 3.4 | 0.8 | 0.50 | 14.67 | In flux |
| w33 | 3.4 | 1.8 | 0.4 | 1.11 | 0.29 | In flux |

TABLE 2

| Wire No. | Wire type | Wire composition (mass %, balance Fe and inevitable impurities) | | | | | | | | | |
|---|---|---|---|---|---|---|---|---|---|---|---|
| | | C | Si | Mn | Cr | Ni | Mo | V | Nb | S | O |
| w34 | FCW | 0.080 | 0.420 | 1.62 | 9.5 | 0.70 | 1.00 | 0.20 | 0.080 | 0.0090 | 0.0050 |
| w35 | FCW | 0.090 | 0.450 | 1.60 | 9.4 | 0.70 | 1.00 | 0.20 | 0.080 | 0.0090 | 0.0050 |
| w36 | FCW | 0.090 | 0.450 | 1.60 | 9.4 | 0.70 | 1.00 | 0.20 | 0.080 | 0.0090 | 0.0050 |
| w37 | FCW | 0.090 | 0.450 | 1.62 | 9.5 | 0.72 | 1.00 | 0.20 | 0.080 | 0.0090 | 0.0050 |
| w38 | FCW | 0.090 | 0.450 | 1.60 | 9.5 | 0.70 | 1.00 | 0.20 | 0.070 | 0.0090 | 0.0050 |
| w39 | FCW | 0.090 | 0.450 | 1.50 | 9.5 | 0.70 | 0.30 | 0.20 | 0.080 | 0.0080 | 0.0050 |
| w40 | FCW | 0.090 | 0.450 | 1.49 | 9.5 | 0.72 | 0.30 | 0.20 | 0.080 | 0.0070 | 0.0050 |
| w41 | FCW | 0.090 | 0.450 | 1.50 | 9.5 | 0.70 | 0.30 | 0.20 | 0.080 | 0.0080 | 0.0050 |
| w42 | FCW | 0.090 | 0.450 | 1.60 | 9.5 | 0.70 | 0.50 | 0.23 | 0.080 | 0.0090 | 0.0040 |
| w43 | FCW | 0.090 | 0.450 | 1.60 | 9.5 | 0.72 | 0.40 | 0.20 | 0.080 | 0.0090 | 0.0050 |
| w44 | FCW | 0.090 | 0.450 | 1.60 | 9.4 | 0.70 | 0.50 | 0.20 | 0.080 | 0.0090 | 0.0050 |
| w45 | FCW | 0.090 | 0.450 | 1.62 | 9.4 | 0.70 | 0.80 | 0.20 | 0.080 | 0.0090 | 0.0050 |
| w46 | FCW | 0.090 | 0.450 | 1.61 | 9.4 | 0.72 | 0.90 | 0.18 | 0.070 | 0.0090 | 0.0040 |
| w47 | FCW | 0.090 | 0.450 | 1.60 | 9.4 | 0.70 | 0.80 | 0.20 | 0.080 | 0.0090 | 0.0050 |
| w48 | FCW | 0.090 | 0.450 | 1.60 | 9.4 | 0.70 | 0.70 | 0.23 | 0.080 | 0.0070 | 0.0050 |

| Wire No. | Wire composition (mass %, balance Fe and inevitable impurities) | | | | | | | | | | |
|---|---|---|---|---|---|---|---|---|---|---|---|
| | REM | | | | | N | W | Co | Ta | B | Cu |
| | La | Ce | Sc | Y | Total | | | | | | |
| w34 | 0.0130 | 0.0200 | — | — | 0.0330 | 0.01 | — | — | | | — |
| w35 | 0.0130 | 0.0210 | — | — | 0.0340 | 0.10 | — | — | | | — |
| w36 | 0.0130 | 0.0210 | — | — | 0.0340 | 0.15 | — | — | — | — | — |
| w37 | 0.0130 | 0.0190 | — | — | 0.0320 | — | — | — | — | — | — |
| w38 | 0.0130 | 0.0180 | — | — | 0.0310 | 0.08 | — | — | — | — | — |
| w39 | 0.0130 | 0.0210 | — | — | 0.0340 | 0.03 | 3.0 | — | — | — | — |
| w40 | 0.0130 | 0.0210 | — | — | 0.0340 | 0.03 | 3.5 | — | — | — | — |
| w41 | 0.0110 | 0.0210 | — | — | 0.0320 | 0.03 | 2.5 | — | — | — | — |
| w42 | 0.0130 | 0.0190 | — | — | 0.0320 | 0.03 | — | 3.0 | — | — | — |
| w43 | 0.0130 | 0.0180 | — | — | 0.0310 | 0.03 | — | 3.4 | — | — | — |
| w44 | 0.0130 | 0.0190 | — | — | 0.0320 | 0.03 | — | 2.5 | — | — | — |
| w45 | 0.0120 | 0.0210 | — | — | 0.0330 | 0.03 | — | — | 0.5 | — | — |
| w46 | 0.0130 | 0.0200 | — | — | 0.0330 | 0.03 | — | — | 1.0 | — | — |
| w47 | 0.0130 | 0.0200 | — | — | 0.0330 | 0.03 | — | — | — | 0.005 | — |
| w48 | 0.0130 | 0.0210 | — | — | 0.0340 | 0.03 | — | — | — | 0.010 | — |

TABLE 2-continued

| Wire No. | Relationship (1) | Relationship (2) | Relationship (3) | Relationship (4) | Relationship (5) | Addition place of REM |
|---|---|---|---|---|---|---|
| w34 | 29.3 | 2.4 | 0.7 | 0.56 | 2.36 | In flux |
| w35 | 30.0 | 2.4 | 0.6 | 0.56 | 2.43 | In flux |
| w36 | 30.0 | 2.4 | 0.6 | 0.56 | 2.43 | In flux |
| w37 | 28.6 | 2.5 | 0.7 | 0.56 | 2.29 | In flux |
| w38 | 27.1 | 2.3 | 0.7 | 0.56 | 2.21 | In flux |
| w39 | 32.3 | 2.4 | 0.6 | 0.63 | 2.62 | In flux |
| w40 | 35.0 | 2.4 | 0.6 | 0.71 | 2.83 | In flux |
| w41 | 30.8 | 2.5 | 0.5 | 0.63 | 2.46 | In flux |
| w42 | 30.8 | 2.5 | 0.7 | 0.44 | 2.46 | In flux |
| w43 | 27.9 | 2.6 | 0.7 | 0.56 | 2.21 | In flux |
| w44 | 28.6 | 2.5 | 0.7 | 0.56 | 2.29 | In flux |
| w45 | 29.3 | 2.4 | 0.6 | 0.56 | 2.36 | In flux |
| w46 | 30.8 | 2.1 | 0.7 | 0.44 | 2.54 | In flux |
| w47 | 29.3 | 2.4 | 0.7 | 0.56 | 2.36 | In flux |
| w48 | 35.0 | 2.4 | 0.6 | 0.71 | 2.83 | In flux |

| Wire No. | Wire type | Wire composition (mass %, balance Fe and inevitable impurities) | | | | | | | | | |
|---|---|---|---|---|---|---|---|---|---|---|---|
| | | C | Si | Mn | Cr | Ni | Mo | V | Nb | S | O |
| w49 | FCW | 0.090 | 0.450 | 1.60 | 9.4 | 0.72 | 0.50 | 0.23 | 0.080 | 0.0080 | 0.0050 |
| w50 | FCW | 0.090 | 0.450 | 1.60 | 9.4 | 0.70 | 0.30 | 0.20 | 0.080 | 0.0090 | 0.0050 |
| w51 | FCW | 0.090 | 0.450 | 1.10 | 9.4 | 0.70 | 0.40 | 0.20 | 0.080 | 0.0090 | 0.0050 |
| w52 | FCW | 0.080 | 0.420 | 1.60 | 9.5 | 0.72 | 1.00 | 0.20 | 0.180 | 0.0090 | 0.0050 |
| w53 | FCW | 0.090 | 0.450 | 1.60 | 9.4 | 0.70 | 1.00 | 0.20 | 0.050 | 0.0070 | 0.0040 |
| w54 | FCW | 0.080 | 0.440 | 1.61 | 9.4 | 0.70 | 1.00 | 0.20 | 0.190 | 0.0080 | 0.0050 |
| w55 | FCW | 0.090 | 0.440 | 1.60 | 9.4 | 0.72 | 1.00 | 0.20 | 0.030 | 0.0080 | 0.0030 |
| w56 | FCW | 0.090 | 0.450 | 1.60 | 9.5 | 0.72 | 1.00 | 0.20 | 0.080 | 0.0080 | 0.0050 |
| w57 | FCW | 0.090 | 0.450 | 1.60 | 9.5 | 0.72 | 0.90 | 0.20 | 0.080 | 0.0080 | 0.0050 |
| w58 | FCW | 0.090 | 0.450 | 1.60 | 9.4 | 0.70 | 0.90 | 0.22 | 0.080 | 0.0080 | 0.0050 |
| w59 | FCW | 0.090 | 0.450 | 1.60 | 9.5 | 0.70 | 0.80 | 0.20 | 0.080 | 0.0080 | 0.0050 |
| w60 | FCW | 0.090 | 0.450 | 1.62 | 9.4 | 0.72 | 1.00 | 0.20 | 0.080 | 0.0080 | 0.0060 |
| w61 | FCW | 0.090 | 0.450 | 1.60 | 9.4 | 0.72 | 1.00 | 0.18 | 0.080 | 0.0090 | 0.0040 |
| w62 | FCW | 0.090 | 0.450 | 1.60 | 9.5 | 0.72 | 1.00 | 0.20 | 0.080 | 0.0090 | 0.0050 |
| w63 | FCW | 0.090 | 0.450 | 1.61 | 9.5 | 0.72 | 0.90 | 0.20 | 0.080 | 0.0090 | 0.0050 |

| Wire No. | Wire composition (mass %, balance Fe and inevitable impurities) | | | | | | | | | | |
|---|---|---|---|---|---|---|---|---|---|---|---|
| | REM | | | | | N | W | Co | Ta | B | Cu |
| | La | Ce | Sc | Y | Total | | | | | | |
| w49 | 0.0120 | 0.0200 | — | — | 0.0320 | 0.03 | — | — | — | — | 2.0 |
| w50 | 0.0130 | 0.0210 | — | — | 0.0340 | 0.03 | — | — | — | — | 3.0 |
| w51 | 0.0130 | 0.0210 | — | — | 0.0340 | 0.03 | 1.0 | 0.5 | 0.5 | 0.002 | 0.5 |
| w52 | 0.0009 | 0.0014 | — | — | 0.0023 | 0.03 | — | — | — | — | — |
| w53 | 0.0200 | 0.0280 | — | — | 0.0480 | 0.03 | — | — | — | — | — |
| w54 | 0.0008 | 0.0014 | — | — | 0.0022 | 0.03 | — | — | — | — | — |
| w55 | 0.0220 | 0.0280 | — | — | 0.0500 | 0.03 | — | — | — | — | — |
| w56 | 0.0180 | 0.0160 | — | — | 0.0340 | 0.03 | — | — | — | — | — |
| w57 | 0.0060 | 0.0270 | — | — | 0.0330 | 0.03 | — | — | — | — | — |
| w58 | 0.0200 | 0.0140 | — | — | 0.0340 | 0.03 | — | — | — | — | — |
| w59 | 0.0020 | 0.0270 | — | — | 0.0290 | 0.03 | — | — | — | — | — |
| w60 | 0.0040 | 0.0080 | 0.0060 | 0.0060 | 0.0240 | 0.03 | — | — | — | — | — |
| w61 | 0.0120 | — | 0.0130 | 0.0120 | 0.0370 | 0.03 | — | — | — | — | — |
| w62 | — | 0.0130 | 0.0140 | 0.0110 | 0.0380 | 0.03 | — | — | — | — | — |
| w63 | — | — | 0.0130 | 0.0240 | 0.0370 | 0.03 | — | — | — | — | — |

| Wire No. | Relationship (1) | Relationship (2) | Relationship (3) | Relationship (4) | Relationship (5) | Addition place of REM |
|---|---|---|---|---|---|---|
| w49 | 30.8 | 2.5 | 0.6 | 0.63 | 2.46 | In flux |
| w50 | 30.0 | 2.4 | 0.6 | 0.56 | 2.43 | In flux |
| w51 | 30.0 | 2.4 | 0.6 | 0.56 | 2.43 | In flux |
| w52 | 14.5 | 78.3 | 0.6 | 0.56 | 0.16 | In flux |
| w53 | 48.2 | 1.0 | 0.7 | 0.57 | 4.36 | In flux |
| w54 | 16.3 | 86.4 | 0.6 | 0.63 | 0.17 | In flux |
| w55 | 48.2 | 0.6 | 0.8 | 0.38 | 4.55 | In flux |
| w56 | 32.3 | 2.4 | 1.1 | 0.63 | 2.62 | In flux |
| w57 | 31.5 | 2.4 | 0.2 | 0.63 | 2.54 | In flux |
| w58 | 32.3 | 2.4 | 1.4 | 0.63 | 2.62 | In flux |
| w59 | 28.5 | 2.8 | 0.1 | 0.63 | 2.23 | In flux |
| w60 | 22.9 | 3.3 | 0.5 | 0.75 | 1.71 | In flux |
| w61 | 34.6 | 2.2 | — | 0.44 | 2.85 | In flux |
| w62 | 32.9 | 2.1 | — | 0.56 | 2.71 | In flux |
| w63 | 32.1 | 2.2 | — | 0.56 | 2.64 | In flux |

TABLE 3

| Wire No. | Wire type | Wire composition (mass %, balance Fe and inevitable impurities) | | | | | | | | | |
|---|---|---|---|---|---|---|---|---|---|---|---|
| | | C | Si | Mn | Cr | Ni | Mo | V | Nb | S | O |
| w64 | FCW | 0.090 | 0.450 | 1.61 | 9.5 | 0.72 | 1.00 | 0.20 | 0.080 | 0.0020 | 0.0080 |
| w65 | FCW | 0.090 | 0.450 | 1.60 | 9.5 | 0.72 | 0.80 | 0.23 | 0.080 | 0.0150 | 0.0020 |
| w66 | FCW | 0.090 | 0.450 | 1.60 | 9.5 | 0.72 | 1.00 | 0.20 | 0.080 | 0.0040 | 0.0020 |
| w67 | FCW | 0.090 | 0.450 | 1.60 | 9.4 | 0.72 | 1.00 | 0.18 | 0.080 | 0.0140 | 0.0180 |
| w68 | FCW | 0.080 | 0.450 | 1.60 | 9.5 | 0.72 | 1.00 | 0.18 | 0.080 | 0.0030 | 0.0150 |
| w69 | FCW | 0.090 | 0.450 | 1.62 | 9.5 | 0.72 | 1.00 | 0.20 | 0.080 | 0.0150 | 0.0010 |
| w70 | FCW | 0.090 | 0.450 | 1.60 | 9.5 | 0.72 | 1.00 | 0.20 | 0.080 | 0.0030 | 0.0020 |
| w71 | FCW | 0.080 | 0.450 | 1.60 | 9.4 | 0.72 | 0.90 | 0.20 | 0.080 | 0.0150 | 0.0250 |
| w72 | FCW | 0.080 | 0.440 | 1.60 | 9.5 | 0.72 | 1.00 | 0.18 | 0.080 | 0.0090 | 0.0050 |
| w73 | FCW | 0.080 | 0.450 | 1.60 | 9.4 | 0.70 | 1.00 | 0.20 | 0.080 | 0.0090 | 0.0050 |
| w74 | Solid Wire | 0.080 | 0.440 | 1.60 | 9.5 | 0.70 | 1.00 | 0.20 | 0.080 | 0.0090 | 0.0050 |
| w75 | Solid Wire | 0.080 | 0.450 | 1.60 | 9.4 | 0.70 | 1.00 | 0.20 | 0.080 | 0.0080 | 0.0050 |
| w76 | Solid Wire | 0.080 | 0.440 | 1.61 | 9.5 | 0.72 | 1.00 | 0.20 | 0.080 | 0.0090 | 0.0050 |

| Wire No. | Wire composition (mass %, balance Fe and inevitable impurities) | | | | | | | | | | |
|---|---|---|---|---|---|---|---|---|---|---|---|
| | REM | | | | | N | W | Co | Ta | B | Cu |
| | La | Ce | Sc | Y | Total | | | | | | |
| w64 | 0.0130 | 0.0210 | — | — | 0.0340 | 0.03 | — | — | — | — | — |
| w65 | 0.0120 | 0.0190 | — | — | 0.0310 | 0.03 | — | — | — | — | — |
| w66 | 0.0140 | 0.0250 | — | — | 0.0390 | 0.03 | — | — | — | — | — |
| w67 | 0.0020 | 0.0080 | — | — | 0.0100 | 0.03 | — | — | — | — | — |
| w68 | 0.0120 | 0.0190 | — | — | 0.0310 | 0.03 | — | — | — | — | — |
| w69 | 0.0120 | 0.0200 | — | — | 0.0320 | 0.03 | — | — | — | — | — |
| w70 | 0.0150 | 0.0250 | — | — | 0.0400 | 0.03 | — | — | — | — | — |
| w71 | 0.0020 | 0.0080 | — | — | 0.0100 | 0.03 | — | — | — | — | — |
| w72 | 0.0110 | 0.0200 | — | — | 0.0310 | 0.03 | — | — | — | — | — |
| w73 | 0.0120 | 0.0180 | — | — | 0.0300 | 0.03 | — | — | — | — | — |
| w74 | 0.0110 | 0.0200 | — | — | 0.0310 | 0.03 | — | — | — | — | — |
| w75 | 0.0120 | 0.0180 | — | — | 0.0300 | 0.03 | — | — | — | — | 0.2 |
| w76 | 0.0110 | 0.0200 | — | — | 0.0310 | 0.03 | — | — | — | — | — |

| Wire No. | Relationship (1) | Relationship (2) | Relationship (3) | Relationship (4) | Relationship (5) | Addition place of REM |
|---|---|---|---|---|---|---|
| w64 | 42.0 | 2.4 | 0.6 | 4.00 | 3.40 | In flux |
| w65 | 22.9 | 2.6 | 0.6 | 0.13 | 1.82 | In flux |
| w66 | 78.3 | 2.1 | 0.6 | 0.50 | 6.50 | In flux |
| w67 | 5.6 | 8.0 | 0.3 | 1.29 | 0.31 | In flux |
| w68 | 21.7 | 2.6 | 0.6 | 5.00 | 1.72 | In flux |
| w69 | 25.0 | 2.5 | 0.6 | 0.07 | 2.00 | In flux |
| w70 | 96.0 | 2.0 | 0.6 | 0.67 | 8.00 | In flux |
| w71 | 4.5 | 8.0 | 0.3 | 1.67 | 0.25 | In flux |
| w72 | 27.9 | 2.6 | 0.6 | 0.6 | 2.2 | In hoop |
| w73 | 27.1 | 2.7 | 0.7 | 0.6 | 2.1 | Hoop surface |
| w74 | 27.9 | 2.6 | 0.6 | 0.6 | 2.2 | In wire |
| w75 | 29.2 | 2.7 | 0.7 | 0.6 | 2.3 | In wire |
| w76 | 27.9 | 2.6 | 0.6 | 0.6 | 2.2 | Wire surface |

| Wire No. | Wire type | Wire composition (mass %, balance Fe and inevitable impurities) | | | | | | | | | |
|---|---|---|---|---|---|---|---|---|---|---|---|
| | | C | Si | Mn | Cr | Ni | Mo | V | Nb | S | O |
| w77 | FCW | 0.040 | 0.450 | 1.60 | 9.4 | 0.70 | 1.00 | 0.23 | 0.080 | 0.0090 | 0.0050 |
| w78 | FCW | 0.150 | 0.450 | 1.60 | 9.4 | 0.72 | 1.00 | 0.22 | 0.080 | 0.0080 | 0.0050 |
| w79 | FCW | 0.080 | 0.800 | 1.60 | 9.4 | 0.70 | 1.00 | 0.23 | 0.080 | 0.0080 | 0.0050 |
| w80 | FCW | 0.080 | 0.450 | 0.40 | 9.4 | 0.72 | 1.00 | 0.20 | 0.080 | 0.0090 | 0.0050 |
| w81 | FCW | 0.080 | 0.440 | 1.80 | 9.4 | 0.72 | 1.00 | 0.20 | 0.080 | 0.0090 | 0.0050 |
| w82 | FCW | 0.070 | 0.440 | 1.60 | 8.0 | 0.70 | 0.80 | 0.20 | 0.060 | 0.0080 | 0.0050 |
| w83 | FCW | 0.080 | 0.450 | 1.61 | 12.0 | 0.72 | 0.80 | 0.20 | 0.070 | 0.0090 | 0.0050 |
| w84 | FCW | 0.080 | 0.440 | 1.60 | 9.5 | 1.00 | 0.90 | 0.18 | 0.080 | 0.0090 | 0.0050 |
| w85 | FCW | 0.080 | 0.450 | 1.60 | 9.4 | 0.71 | 0.20 | 0.20 | 0.080 | 0.0090 | 0.0050 |
| w86 | FCW | 0.080 | 0.440 | 1.60 | 9.4 | 0.72 | 1.20 | 0.20 | 0.060 | 0.0090 | 0.0050 |
| w87 | FCW | 0.080 | 0.440 | 1.60 | 9.4 | 0.72 | 0.80 | 0.15 | 0.080 | 0.0090 | 0.0050 |
| w88 | FCW | 0.080 | 0.450 | 1.61 | 9.5 | 0.72 | 1.00 | 0.25 | 0.080 | 0.0090 | 0.0050 |

| Wire No. | Wire composition (mass %, balance Fe and inevitable impurities) | | | | | | | | | | |
|---|---|---|---|---|---|---|---|---|---|---|---|
| | REM | | | | | N | W | Co | Ta | B | Cu |
| | La | Ce | Sc | Y | Total | | | | | | |
| w77 | 0.0120 | 0.0190 | — | — | 0.0310 | 0.03 | — | — | — | — | — |
| w78 | 0.0110 | 0.0180 | — | — | 0.0290 | 0.03 | — | — | — | — | — |

TABLE 3-continued

| | | | | | | | | | | | |
|---|---|---|---|---|---|---|---|---|---|---|---|
| w79 | 0.0110 | 0.0200 | — | — | 0.0310 | 0.03 | — | — | — | — | — |
| w80 | 0.0120 | 0.0200 | — | — | 0.0320 | 0.03 | — | — | — | — | — |
| w81 | 0.0120 | 0.0180 | — | — | 0.0300 | 0.03 | — | — | — | — | — |
| w82 | 0.0120 | 0.0180 | — | — | 0.0300 | 0.03 | — | — | — | — | — |
| w83 | 0.0120 | 0.0190 | — | — | 0.0310 | 0.03 | — | — | — | — | — |
| w84 | 0.0120 | 0.0200 | — | — | 0.0320 | 0.03 | — | — | — | — | — |
| w85 | 0.0120 | 0.0180 | — | — | 0.0300 | 0.03 | — | — | — | — | — |
| w86 | 0.0110 | 0.0200 | — | — | 0.0310 | 0.03 | — | — | — | — | — |
| w87 | 0.0110 | 0.0200 | — | — | 0.0310 | 0.03 | — | — | — | — | — |
| w88 | 0.0120 | 0.0190 | — | — | 0.0310 | 0.03 | — | — | — | — | — |

| Wire No. | Relationship (1) | Relationship (2) | Relationship (3) | Relationship (4) | Relationship (5) | Addition place of REM |
|---|---|---|---|---|---|---|
| w77 | 27.9 | 2.6 | 0.6 | 0.6 | 2.2 | In flux |
| w78 | 28.5 | 2.8 | 0.6 | 0.6 | 2.2 | In flux |
| w79 | 30.0 | 2.6 | 0.6 | 0.6 | 2.4 | In flux |
| w80 | 28.6 | 2.5 | 0.6 | 0.6 | 2.3 | In flux |
| w81 | 27.1 | 2.7 | 0.7 | 0.6 | 2.1 | In flux |
| w82 | 27.7 | 2.0 | 0.7 | 0.6 | 2.3 | In flux |
| w83 | 27.1 | 2.3 | 0.6 | 0.6 | 2.2 | In flux |
| w84 | 28.6 | 2.5 | 0.6 | 0.6 | 2.3 | In flux |
| w85 | 27.1 | 2.7 | 0.7 | 0.6 | 2.1 | In flux |
| w86 | 26.4 | 1.9 | 0.6 | 0.6 | 2.2 | In flux |
| w87 | 27.9 | 2.6 | 0.6 | 0.6 | 2.2 | In flux |
| w88 | 27.9 | 2.6 | 0.6 | 0.6 | 2.2 | In flux |

TABLE 4

| Wire No. | Wire type | Wire composition (mass %, balance Fe and inevitable impurities) | | | | | | | | | |
|---|---|---|---|---|---|---|---|---|---|---|---|
| | | C | Si | Mn | Cr | Ni | Mo | V | Nb | S | O |
| w89 | FCW | 0.080 | 0.450 | 1.60 | 9.5 | 0.70 | 1.00 | 0.17 | 0.070 | 0.0070 | 0.0050 |
| w90 | FCW | 0.080 | 0.450 | 1.60 | 9.4 | 0.70 | 1.00 | 0.21 | 0.060 | 0.0090 | 0.0050 |
| w91 | FCW | 0.080 | 0.440 | 1.60 | 9.4 | 0.70 | 1.00 | 0.20 | 0.005 | 0.0080 | 0.0050 |
| w92 | FCW | 0.080 | 0.450 | 1.60 | 9.4 | 0.70 | 1.00 | 0.20 | — | 0.0080 | 0.0040 |
| w93 | FCW | 0.080 | 0.440 | 1.60 | 9.4 | 0.71 | 1.00 | 0.20 | — | 0.0080 | 0.0040 |
| w94 | FCW | 0.080 | 0.450 | 1.60 | 9.4 | 0.70 | 1.00 | 0.20 | 0.250 | 0.0080 | 0.0050 |
| w95 | FCW | 0.080 | 0.440 | 1.61 | 9.4 | 0.70 | 1.00 | 0.20 | 0.060 | 0.0005 | 0.0050 |
| w96 | FCW | 0.080 | 0.450 | 1.60 | 9.5 | 0.70 | 1.00 | 0.21 | 0.070 | 0.0260 | 0.0040 |
| w97 | FCW | 0.080 | 0.440 | 1.61 | 9.4 | 0.70 | 1.00 | 0.21 | 0.060 | 0.0090 | 0.0300 |
| w98 | FCW | 0.006 | 0.440 | 1.60 | 9.5 | 0.70 | 0.90 | 0.18 | 0.070 | 0.0080 | 0.0040 |
| w99 | FCW | 0.560 | 0.450 | 1.60 | 9.5 | 0.70 | 1.00 | 0.20 | 0.070 | 0.0080 | 0.0050 |
| w100 | FCW | 0.080 | 0.005 | 1.60 | 9.4 | 0.70 | 1.00 | 0.20 | 0.070 | 0.0080 | 0.0050 |
| w101 | FCW | 0.080 | 1.600 | 1.60 | 9.4 | 0.70 | 1.00 | 0.20 | 0.070 | 0.0080 | 0.0050 |

| Wire No. | Wire composition (mass %, balance Fe and inevitable impurities) | | | | | | | | | | |
|---|---|---|---|---|---|---|---|---|---|---|---|
| | REM | | | | | N | W | Co | Ta | B | Cu |
| | La | Ce | Sc | Y | Total | | | | | | |
| w89 | 0.0002 | 0.0005 | — | — | 0.0007 | 0.03 | — | — | — | — | — |
| w90 | 0.0260 | 0.0280 | — | — | 0.0540 | 0.03 | — | — | — | — | — |
| w91 | 0.0120 | 0.0180 | — | — | 0.0300 | 0.03 | — | — | — | — | — |
| w92 | 0.0120 | 0.0190 | — | — | 0.0310 | 0.03 | — | — | — | — | — |
| w93 | 0.0120 | 0.0180 | — | — | 0.0300 | 0.03 | — | — | 0.2 | — | — |
| w94 | 0.0120 | 0.0180 | — | — | 0.0300 | 0.03 | — | — | — | — | — |
| w95 | 0.0120 | 0.0200 | — | — | 0.0320 | 0.03 | — | — | — | — | — |
| w96 | 0.0120 | 0.0180 | — | — | 0.0300 | 0.03 | — | — | — | — | — |
| w97 | 0.0120 | 0.0210 | — | — | 0.0330 | 0.03 | — | — | — | — | — |
| w98 | 0.0120 | 0.0180 | — | — | 0.0300 | 0.03 | — | — | — | — | — |
| w99 | 0.0120 | 0.0220 | — | — | 0.0340 | 0.03 | — | — | — | — | — |
| w100 | 0.0120 | 0.0180 | — | — | 0.0300 | 0.03 | — | — | — | — | — |
| w101 | 0.0120 | 0.0190 | — | — | 0.0310 | 0.03 | — | — | — | — | — |

| Wire No. | Relationship (1) | Relationship (2) | Relationship (3) | Relationship (4) | Relationship (5) | Addition place of REM |
|---|---|---|---|---|---|---|
| w89 | 6.4 | 100.0 | 0.4 | 0.7 | 0.1 | In flux |
| w90 | 42.9 | 1.1 | 0.9 | 0.6 | 3.9 | In flux |
| w91 | 23.5 | 0.2 | 0.7 | 0.6 | 2.3 | In flux |
| w92 | — | — | 0.6 | 0.5 | 2.6 | In flux |
| w93 | — | — | 0.7 | 0.5 | 2.5 | In flux |
| w94 | 42.3 | 8.3 | 0.7 | 0.6 | 2.3 | In flux |
| w95 | 69.1 | 1.9 | 0.6 | 10.0 | 5.8 | In flux |

TABLE 4-continued

| | | | | | | |
|---|---|---|---|---|---|---|
| w96 | 12.3 | 2.3 | 0.7 | 0.2 | 1.0 | In flux |
| w97 | 10.0 | 1.8 | 0.6 | 3.3 | 0.8 | In flux |
| w98 | 30.8 | 2.3 | 0.7 | 0.5 | 2.5 | In flux |
| w99 | 31.5 | 2.1 | 0.5 | 0.6 | 2.6 | In flux |
| w100 | 28.5 | 2.3 | 0.7 | 0.6 | 2.3 | In flux |
| w101 | 29.2 | 2.3 | 0.6 | 0.6 | 2.4 | In flux |

| Wire No. | Wire type | Wire composition (mass %, balance Fe and inevitable impurities) | | | | | | | | |
|---|---|---|---|---|---|---|---|---|---|---|
| | | C | Si | Mn | Cr | Ni | Mo | V | Nb | S | O |
| w102 | FCW | 0.080 | 0.440 | 0.05 | 9.4 | 0.70 | 1.00 | 0.20 | 0.060 | 0.0080 | 0.0050 |
| w103 | FCW | 0.080 | 0.450 | 2.80 | 9.4 | 0.70 | 1.00 | 0.20 | 0.070 | 0.0080 | 0.0050 |
| w104 | FCW | 0.080 | 0.450 | 1.60 | 4.0 | 0.70 | 1.00 | 0.20 | 0.070 | 0.0080 | 0.0040 |
| w105 | FCW | 0.080 | 0.450 | 1.60 | 16.0 | 0.70 | 1.00 | 0.20 | 0.070 | 0.0080 | 0.0040 |
| w106 | FCW | 0.080 | 0.450 | 1.60 | 9.5 | 0.01 | 1.00 | 0.20 | 0.070 | 0.0090 | 0.0050 |
| w107 | FCW | 0.080 | 0.450 | 1.61 | 9.5 | 1.70 | 1.00 | 0.20 | 0.070 | 0.0080 | 0.0040 |
| w108 | FCW | 0.080 | 0.450 | 1.60 | 9.5 | 0.71 | 0.05 | 0.21 | 0.070 | 0.0080 | 0.0050 |
| w109 | FCW | 0.080 | 0.450 | 1.61 | 9.4 | 0.70 | 2.30 | 0.21 | 0.070 | 0.0080 | 0.0050 |
| w110 | FCW | 0.080 | 0.440 | 1.61 | 9.5 | 0.70 | 0.90 | 0.05 | 0.070 | 0.0080 | 0.0050 |
| w111 | FCW | 0.080 | 0.440 | 1.60 | 9.5 | 0.70 | 1.00 | 1.20 | 0.060 | 0.0080 | 0.0050 |
| w112 | FCW | 0.080 | 0.450 | 1.60 | 9.5 | 0.70 | 1.00 | 0.20 | 0.190 | 0.0020 | 0.0010 |
| w113 | FCW | 0.080 | 0.450 | 1.60 | 9.5 | 0.70 | 1.00 | 0.21 | 0.015 | 0.0180 | 0.0200 |

| Wire No. | Wire composition (mass %, balance Fe and inevitable impurities) | | | | | | | | | | |
|---|---|---|---|---|---|---|---|---|---|---|---|
| | REM | | | | | N | W | Co | Ta | B | Cu |
| | La | Ce | Sc | Y | Total | | | | | | |
| w102 | 0.0120 | 0.0180 | — | — | 0.0300 | 0.03 | — | — | — | — | — |
| w103 | 0.0120 | 0.0180 | — | — | 0.0300 | 0.03 | — | — | — | — | — |
| w104 | 0.0120 | 0.0180 | — | — | 0.0300 | 0.03 | — | — | — | — | — |
| w105 | 0.0120 | 0.0190 | — | — | 0.0310 | 0.03 | — | — | — | — | — |
| w106 | 0.0120 | 0.0190 | — | — | 0.0310 | 0.03 | — | — | — | — | — |
| w107 | 0.0120 | 0.0180 | — | — | 0.0300 | 0.03 | — | — | — | — | — |
| w108 | 0.0120 | 0.0180 | — | — | 0.0300 | 0.03 | — | — | — | — | — |
| w109 | 0.0120 | 0.0180 | — | — | 0.0300 | 0.03 | — | — | — | — | — |
| w110 | 0.0120 | 0.0190 | — | — | 0.0310 | 0.03 | — | — | — | — | — |
| w111 | 0.0120 | 0.0190 | — | — | 0.0310 | 0.03 | — | — | — | — | — |
| w112 | 0.0190 | 0.0250 | — | — | 0.0440 | 0.03 | — | — | — | — | — |
| w113 | 0.0030 | 0.0060 | — | — | 0.0090 | 0.03 | — | — | — | — | — |

| Wire No. | Relationship (1) | Relationship (2) | Relationship (3) | Relationship (4) | Relationship (5) | Addition place of REM |
|---|---|---|---|---|---|---|
| w102 | 27.7 | 2.0 | 0.7 | 0.6 | 2.3 | In flux |
| w103 | 28.5 | 2.3 | 0.7 | 0.6 | 2.3 | In flux |
| w104 | 30.8 | 2.3 | 0.7 | 0.5 | 2.5 | In flux |
| w105 | 31.7 | 2.3 | 0.6 | 0.5 | 2.6 | In flux |
| w106 | 27.1 | 2.3 | 0.6 | 0.6 | 2.2 | In flux |
| w107 | 30.8 | 2.3 | 0.7 | 0.5 | 2.5 | In flux |
| w108 | 28.5 | 2.3 | 0.7 | 0.6 | 2.3 | In flux |
| w109 | 28.5 | 2.3 | 0.7 | 0.6 | 2.3 | In flux |
| w110 | 29.2 | 2.3 | 0.6 | 0.6 | 2.4 | In flux |
| w111 | 28.5 | 1.9 | 0.6 | 0.6 | 2.4 | In flux |
| w112 | 210.0 | 4.3 | 0.8 | 0.5 | 14.7 | In flux |
| w113 | 2.8 | 1.7 | 0.5 | 1.1 | 0.2 | In flux |

TABLE 5

| Test No. | Wire No. | Shielding gas | Polarity | Power supply characteristics | Presence or absence of welding current pulse | Evaluations | | | | | |
|---|---|---|---|---|---|---|---|---|---|---|---|
| | | | | | | Arc stability | Bead appearance | Welding defects such as lack of fusion, blowhole, and slag inclusion | Hot cracking resistance | Toughness | Creep strength |
| 1 | w1 | 100% Ar | DCEP | constant voltage characteristic | absence | A | ○ | ○ | ○ | A | A |
| 2 | w1 | 100% He | DCEP | constant voltage characteristic | absence | A | ○ | ○ | ○ | A | A |
| 3 | w1 | 90% Ar + 10% CO$_2$ | DCEP | constant voltage characteristic | absence | A | ○ | ○ | ○ | A | A |
| 4 | w1 | 90% He + 10% CO$_2$ | DCEP | constant voltage characteristic | absence | A | ○ | ○ | ○ | A | A |
| 5 | w1 | 97% Ar + 3% O$_2$ | DCEP | constant voltage characteristic | absence | A | ○ | ○ | ○ | A | A |

TABLE 5-continued

| Test No. | Wire No. | Shielding gas | Polarity | Power supply characteristics | Presence or absence of welding current pulse | Arc stability | Bead appearance | Welding defects such as lack of fusion, blowhole, and slag inclusion | Hot cracking resistance | Toughness | Creep strength |
|---|---|---|---|---|---|---|---|---|---|---|---|
| 6 | w1 | 80% Ar + 20% He | DCEP | constant voltage characteristic | absence | A | ○ | ○ | ○ | A | A |
| 7 | w1 | 80% Ar + 20% CO$_2$ | DCEP | constant voltage characteristic | absence | B | ○ | ○ | ○ | B | A |
| 8 | w1 | 30% Ar + 70% CO$_2$ | DCEP | constant voltage characteristic | absence | B | ○ | ○ | ○ | B | A |
| 9 | w1 | 100% CO$_2$ | DCEP | constant voltage characteristic | absence | B | ○ | ○ | ○ | B | A |
| 10 | w1 | 100% Ar | DCEN | constant voltage characteristic | absence | B | ○ | ○ | ○ | A | A |
| 11 | w1 | 90% Ar + 10% CO$_2$ | DCEN | constant voltage characteristic | absence | B | ○ | ○ | ○ | A | A |
| 12 | w1 | 50% Ar + 50% CO$_2$ | DCEN | constant voltage characteristic | absence | A | ○ | ○ | ○ | A | A |
| 13 | w1 | 100% CO$_2$ | DCEN | constant voltage characteristic | absence | A | ○ | ○ | ○ | A | A |
| 14 | w1 | 60% Ar + 40% CO$_2$ | DCEN | constant voltage characteristic | absence | B | ○ | ○ | ○ | A | A |
| 15 | w1 | 100% Ar | DCEP | constant voltage characteristic | presence | A | ○ | ○ | ○ | A | A |
| 16 | w1 | 100% Ar | DCEP | constant current characteristic | absence | B | ○ | ○ | ○ | A | A |
| 17 | w2 | 100% Ar | DCEP | constant voltage characteristic | absence | A | ○ | ○ | ○ | A | A |
| 18 | w3 | 100% Ar | DCEP | constant voltage characteristic | absence | A | ○ | ○ | ○ | A | A |
| 19 | w4 | 100% Ar | DCEP | constant voltage characteristic | absence | A | ○ | ○ | ○ | A | A |
| 20 | w5 | 100% Ar | DCEP | constant voltage characteristic | absence | A | ○ | ○ | ○ | A | A |
| 21 | w6 | 100% Ar | DCEP | constant voltage characteristic | absence | A | ○ | ○ | ○ | A | A |
| 22 | w7 | 100% Ar | DCEP | constant voltage characteristic | absence | B | ○ | ○ | ○ | A | A |
| 23 | w8 | 100% Ar | DCEP | constant voltage characteristic | absence | B | ○ | ○ | ○ | A | A |
| 24 | w9 | 100% Ar | DCEP | constant voltage characteristic | absence | B | ○ | ○ | ○ | B | A |
| 25 | w10 | 100% Ar | DCEP | constant voltage characteristic | absence | A | ○ | ○ | ○ | A | A |
| 26 | w11 | 100% Ar | DCEP | constant voltage characteristic | absence | B | ○ | ○ | ○ | A | A |

TABLE 6

| Test No. | Wire No. | Shielding gas | Polarity | Power supply characteristics | Presence or absence of welding current pulse | Arc stability | Bead appearance | Welding defects such as lack of fusion, blowhole, and slag inclusion | Hot cracking resistance | Toughness | Creep strength |
|---|---|---|---|---|---|---|---|---|---|---|---|
| 27 | w12 | 100% Ar | DCEP | constant voltage characteristic | absence | A | ○ | ○ | ○ | A | A |
| 28 | w13 | 100% Ar | DCEP | constant voltage characteristic | absence | B | ○ | ○ | ○ | A | A |
| 29 | w14 | 100% Ar | DCEP | constant voltage characteristic | absence | A | ○ | ○ | ○ | B | A |
| 30 | w15 | 100% Ar | DCEP | constant voltage characteristic | absence | A | ○ | ○ | ○ | A | A |
| 31 | w16 | 100% Ar | DCEP | constant voltage characteristic | absence | A | ○ | ○ | ○ | B | A |
| 32 | w17 | 100% Ar | DCEP | constant voltage characteristic | absence | A | ○ | ○ | ○ | B | A |
| 33 | w18 | 100% Ar | DCEP | constant voltage characteristic | absence | A | ○ | ○ | ○ | A | B |
| 34 | w19 | 100% Ar | DCEP | constant voltage characteristic | absence | A | ○ | ○ | ○ | A | B |
| 35 | w20 | 100% Ar | DCEP | constant voltage characteristic | absence | A | ○ | ○ | ○ | B | B |
| 36 | w21 | 100% Ar | DCEP | constant voltage characteristic | absence | B | ○ | ○ | ○ | B | B |
| 37 | w22 | 100% Ar | DCEP | constant voltage characteristic | absence | A | ○ | ○ | ○ | A | B |
| 38 | w23 | 100% Ar | DCEP | constant voltage characteristic | absence | A | ○ | ○ | ○ | A | A |
| 39 | w24 | 100% Ar | DCEP | constant voltage characteristic | absence | A | ○ | ○ | ○ | B | B |
| 40 | w25 | 100% Ar | DCEP | constant voltage characteristic | absence | A | ○ | ○ | ○ | B | A |
| 41 | w26 | 100% Ar | DCEP | constant voltage characteristic | absence | A | ○ | ○ | ○ | A | B |
| 42 | w27 | 100% Ar | DCEP | constant voltage characteristic | absence | A | ○ | ○ | ○ | B | A |
| 43 | w28 | 100% Ar | DCEP | constant voltage characteristic | absence | A | ○ | ○ | ○ | A | A |
| 44 | w29 | 100% Ar | DCEP | constant voltage characteristic | absence | A | ○ | ○ | ○ | A | B |
| 45 | w30 | 100% Ar | DCEP | constant voltage characteristic | absence | A | ○ | ○ | ○ | A | B |
| 46 | w31 | 100% Ar | DCEP | constant voltage characteristic | absence | A | ○ | ○ | ○ | B | B |
| 47 | w32 | 100% Ar | DCEP | constant voltage characteristic | absence | A | ○ | ○ | ○ | A | A |
| 48 | w33 | 100% Ar | DCEP | constant voltage characteristic | absence | A | ○ | ○ | ○ | A | A |

TABLE 7

| Test No. | Wire No. | Shielding gas | Polarity | Power supply characteristics | Presence or absence of welding current pulse | Arc stability | Bead appearance | Welding defects such as lack of fusion, blowhole, and slag inclusion | Hot cracking resistance | Toughness | Creep strength |
|---|---|---|---|---|---|---|---|---|---|---|---|
| 49 | w34 | 100% Ar | DCEP | constant voltage characteristic | absence | A | ○ | ○ | ○ | A | A |
| 50 | w35 | 100% Ar | DCEP | constant voltage characteristic | absence | A | ○ | ○ | ○ | A | A |
| 51 | w36 | 100% Ar | DCEP | constant voltage characteristic | absence | A | ○ | ○ | ○ | B | B |
| 52 | w37 | 100% Ar | DCEP | constant voltage characteristic | absence | A | ○ | ○ | ○ | A | B |
| 53 | w38 | 100% Ar | DCEP | constant voltage characteristic | absence | A | ○ | ○ | ○ | A | A |
| 54 | w39 | 100% Ar | DCEP | constant voltage characteristic | absence | A | ○ | ○ | ○ | A | A |
| 55 | w40 | 100% Ar | DCEP | constant voltage characteristic | absence | A | ○ | ○ | ○ | B | A |
| 56 | w41 | 100% Ar | DCEP | constant voltage characteristic | absence | A | ○ | ○ | ○ | A | A |
| 57 | w42 | 100% Ar | DCEP | constant voltage characteristic | absence | A | ○ | ○ | ○ | A | A |
| 58 | w43 | 100% Ar | DCEP | constant voltage characteristic | absence | A | ○ | ○ | ○ | A | A |
| 59 | w44 | 100% Ar | DCEP | constant voltage characteristic | absence | A | ○ | ○ | ○ | A | A |
| 60 | w45 | 100% Ar | DCEP | constant voltage characteristic | absence | A | ○ | ○ | ○ | A | A |
| 61 | w46 | 100% Ar | DCEP | constant voltage characteristic | absence | A | ○ | ○ | ○ | A | A |
| 62 | w47 | 100% Ar | DCEP | constant voltage characteristic | absence | A | ○ | ○ | ○ | A | A |
| 63 | w48 | 100% Ar | DCEP | constant voltage characteristic | absence | A | ○ | ○ | ○ | A | A |
| 64 | w49 | 100% Ar | DCEP | constant voltage characteristic | absence | A | ○ | ○ | ○ | A | A |
| 65 | w50 | 100% Ar | DCEP | constant voltage characteristic | absence | A | ○ | ○ | ○ | A | A |
| 66 | w51 | 100% Ar | DCEP | constant voltage characteristic | absence | A | ○ | ○ | ○ | A | A |
| 67 | w52 | 100% Ar | DCEP | constant voltage characteristic | absence | A | ○ | ○ | ○ | A | A |
| 68 | w53 | 100% Ar | DCEP | constant voltage characteristic | absence | A | ○ | ○ | ○ | A | A |
| 69 | w54 | 100% Ar | DCEP | constant voltage characteristic | absence | B | ○ | ○ | ○ | A | A |
| 70 | w55 | 100% Ar | DCEP | constant voltage characteristic | absence | B | ○ | ○ | ○ | A | A |
| 71 | w56 | 100% Ar | DCEP | constant voltage characteristic | absence | A | ○ | ○ | ○ | A | A |
| 72 | w57 | 100% Ar | DCEP | constant voltage characteristic | absence | A | ○ | ○ | ○ | A | A |
| 73 | w58 | 100% Ar | DCEP | constant voltage characteristic | absence | B | ○ | ○ | ○ | A | A |
| 74 | w59 | 100% Ar | DCEP | constant voltage characteristic | absence | B | ○ | ○ | ○ | A | A |
| 75 | w60 | 100% Ar | DCEP | constant voltage characteristic | absence | B | ○ | ○ | ○ | A | A |
| 76 | w61 | 100% Ar | DCEP | constant voltage characteristic | absence | B | ○ | ○ | ○ | A | A |
| 77 | w62 | 100% Ar | DCEP | constant voltage characteristic | absence | B | ○ | ○ | ○ | A | A |
| 78 | w63 | 100% Ar | DCEP | constant voltage characteristic | absence | B | ○ | ○ | ○ | A | A |

TABLE 8

| Test No. | Wire No. | Shielding gas | Polarity | Power supply characteristics | Presence or absence of welding current pulse | Arc stability | Bead appearance | Welding defects such as lack of fusion, blowhole, and slag inclusion | Hot cracking resistance | Toughness | Creep strength |
|---|---|---|---|---|---|---|---|---|---|---|---|
| 79 | w64 | 100% Ar | DCEP | constant voltage characteristic | absence | A | ○ | ○ | ○ | A | A |
| 80 | w65 | 100% Ar | DCEP | constant voltage characteristic | absence | A | ○ | ○ | ○ | A | A |
| 81 | w66 | 100% Ar | DCEP | constant voltage characteristic | absence | A | ○ | ○ | ○ | A | A |
| 82 | w67 | 100% Ar | DCEP | constant voltage characteristic | absence | A | ○ | ○ | ○ | A | A |
| 83 | w68 | 100% Ar | DCEP | constant voltage characteristic | absence | B | ○ | ○ | ○ | A | A |
| 84 | w69 | 100% Ar | DCEP | constant voltage characteristic | absence | B | ○ | ○ | ○ | A | A |
| 85 | w70 | 100% Ar | DCEP | constant voltage characteristic | absence | B | ○ | ○ | ○ | A | A |
| 86 | w71 | 100% Ar | DCEP | constant voltage characteristic | absence | B | ○ | ○ | ○ | A | A |
| 87 | w72 | 100% Ar | DCEP | constant voltage characteristic | absence | B | ○ | ○ | ○ | A | A |
| 88 | w73 | 100% Ar | DCEP | constant voltage characteristic | absence | B | ○ | ○ | ○ | A | A |
| 89 | w74 | 100% Ar | DCEP | constant voltage characteristic | absence | A | ○ | ○ | ○ | A | A |
| 90 | w75 | 100% Ar | DCEP | constant voltage characteristic | absence | A | ○ | ○ | ○ | A | A |
| 91 | w76 | 100% Ar | DCEP | constant voltage characteristic | absence | B | ○ | ○ | ○ | A | A |
| 92 | w77 | 100% Ar | DCEP | constant voltage characteristic | absence | A | ○ | ○ | ○ | A | A |
| 93 | w78 | 100% Ar | DCEP | constant voltage characteristic | absence | A | ○ | ○ | ○ | A | A |
| 94 | w79 | 100% Ar | DCEP | constant voltage characteristic | absence | A | ○ | ○ | ○ | A | A |
| 95 | w80 | 100% Ar | DCEP | constant voltage characteristic | absence | A | ○ | ○ | ○ | A | A |
| 96 | w81 | 100% Ar | DCEP | constant voltage characteristic | absence | A | ○ | ○ | ○ | A | A |
| 97 | w82 | 100% Ar | DCEP | constant voltage characteristic | absence | A | ○ | ○ | ○ | A | A |
| 98 | w83 | 100% Ar | DCEP | constant voltage characteristic | absence | A | ○ | ○ | ○ | A | A |
| 99 | w84 | 100% Ar | DCEP | constant voltage characteristic | absence | A | ○ | ○ | ○ | A | A |
| 100 | w85 | 100% Ar | DCEP | constant voltage characteristic | absence | A | ○ | ○ | ○ | A | A |
| 101 | w86 | 100% Ar | DCEP | constant voltage characteristic | absence | A | ○ | ○ | ○ | A | A |
| 102 | w87 | 100% Ar | DCEP | constant voltage characteristic | absence | A | ○ | ○ | ○ | A | A |
| 103 | w88 | 100% Ar | DCEP | constant voltage characteristic | absence | A | ○ | ○ | ○ | A | A |

TABLE 9

| Test No. | Wire No. | Shielding gas | Polarity | Power supply characteristics | Presence or absence of welding current pulse | Arc stability | Bead appearance | Welding defects such as lack of fusion, blowhole, and slag inclusion | Hot cracking resistance | Toughness | Creep strength |
|---|---|---|---|---|---|---|---|---|---|---|---|
| 104 | w89 | 100% Ar | DCEP | constant voltage characteristic | absence | C | x | o | o | A | A |
| 105 | w90 | 100% Ar | DCEP | constant voltage characteristic | absence | A | o | o | o | C | B |
| 106 | w91 | 100% Ar | DCEP | constant voltage characteristic | absence | A | o | x | o | A | A |
| 107 | w92 | 100% Ar | DCEP | constant voltage characteristic | absence | A | o | x | o | A | A |
| 108 | w93 | 100% Ar | DCEP | constant voltage characteristic | absence | A | o | x | o | A | A |
| 109 | w94 | 100% Ar | DCEP | constant voltage characteristic | absence | A | o | o | o | C | A |
| 110 | w95 | 100% Ar | DCEP | constant voltage characteristic | absence | C | o | o | o | A | A |
| 111 | w96 | 100% Ar | DCEP | constant voltage characteristic | absence | A | o | o | x | A | A |
| 112 | w97 | 100% Ar | DCEP | constant voltage characteristic | absence | A | o | x | o | C | B |
| 113 | w98 | 100% Ar | DCEP | constant voltage characteristic | absence | A | o | o | o | C | C |
| 114 | w99 | 100% Ar | DCEP | constant voltage characteristic | absence | B | o | o | x | C | C |
| 115 | w100 | 100% Ar | DCEP | constant voltage characteristic | absence | A | o | x | o | C | C |
| 116 | w101 | 100% Ar | DCEP | constant voltage characteristic | absence | B | o | x | o | B | B |
| 117 | w102 | 100% Ar | DCEP | constant voltage characteristic | absence | A | o | o | o | c | B |
| 118 | w103 | 100% Ar | DCEP | constant voltage characteristic | absence | B | o | x | x | C | C |
| 119 | w104 | 100% Ar | DCEP | constant voltage characteristic | absence | A | o | o | o | B | C |
| 120 | w105 | 100% Ar | DCEP | constant voltage characteristic | absence | B | o | x | x | C | C |
| 121 | w106 | 100% Ar | DCEP | constant voltage characteristic | absence | A | o | o | o | C | B |
| 122 | w107 | 100% Ar | DCEP | constant voltage characteristic | absence | A | o | o | o | B | C |
| 123 | w108 | 100% Ar | DCEP | constant voltage characteristic | absence | A | o | o | o | B | C |
| 124 | w109 | 100% Ar | DCEP | constant voltage characteristic | absence | A | o | o | o | C | B |
| 125 | w110 | 100% Ar | DCEP | constant voltage characteristic | absence | A | o | o | o | B | C |
| 126 | w111 | 100% Ar | DCEP | constant voltage characteristic | absence | A | o | o | o | C | C |
| 127 | w112 | 100% Ar | DCEP | constant voltage characteristic | absence | A | o | o | o | C | B |
| 128 | w113 | 100% Ar | DCEP | constant voltage characteristic | absence | C | x | x | o | C | B |

TABLE 10

| Power supply polarity | Wire diameter | Wire form | Welding current | Arc voltage | Welding speed | Temperature of preheating/interpass |
|---|---|---|---|---|---|---|
| DCEP | 1.2 mm | spool wire | 260 A | 30 V | about 35 cpm | 220° C. to 250° C. |

| Shielding gas composition | Shielding gas flow rate flow rate | Crater processing current | Crater processing arc voltage | Crater processing time |
|---|---|---|---|---|
| Ar-20% $CO_2$ | 20 L/min. | 90 A | 28 V | 5 s |

Tests No. 1 to No. 103 in Tables 5 to 8 are examples using wires W1 to W88 of Tables 1 to 3 that satisfy requirements of the present invention, excellent results can be obtained in any one of arc stability, bead appearance, welding defects (lack of fusion, slag inclusion, blowhole, and the like), hot cracking resistance, toughness, and creep strength.

In addition, Examples satisfying requirements of a preferable embodiment obtained better results in at least one of arc stability, toughness, or creep strength.

In contrast, Tests No. 104 to No. 128 in Table 9 are cases using the wires W89 to W113 in Table 4 that do not satisfy the requirements of the present invention, and have the following defects.

In Test No. 104, an amount of REM in the wire was small, and the arc stability and the bead appearance were poor.

In Test No. 105, an amount of REM in the wire was large, and the toughness was poor.

In Test No. 106, an amount of Nb in the wire was small, and welding defects occurred during multi-layer overlaying.

In Test No. 107, Nb was not added into the wire, and welding defects occurred during multi-layer overlaying.

In Test No. 108, Nb was not added, but Ta was added into the wire, and welding defects occurred during multi-layer overlaying.

In Test No. 109, an amount of Nb in the wire was large, and the toughness was poor.

In Test No. 110, an amount of S in the wire was small, and the arc stability was poor.

In Test No. 111, an amount of S in the wire was large, and the hot cracking resistance was poor.

In Test No. 112, an amount of 0 in the wire was large, a welding defect caused by slag inclusion occurred, and the toughness was poor.

In Test No. 113, an amount of C in the wire was small, and the toughness and creep strength were poor.

In Test No. 114, an amount of C in the wire was large, and the hot cracking resistance, toughness, and creep strength were poor.

In Test No. 115, an amount of Si in the wire was small, welding defects such as lack of fusion occurred, and the toughness and creep strength were poor.

In Test No. 116, an amount of Si in the wire was large, and a welding defect caused by slag inclusion occurred.

In Test No. 117, an amount of Mn in the wire was small, and the toughness was poor.

In Test No. 118, an amount of Mn in the wire was large, a welding defect caused by slag inclusion occurred, and the hot cracking resistance, toughness, and creep strength were poor.

In Test number 119, an amount of Cr in the wire was small, and the creep strength was poor.

In Test No. 120, an amount of Cr in the wire was large, a welding defect caused by slag inclusion occurred, and the hot cracking resistance, toughness, and creep strength were poor.

In Test No. 121, an amount of Ni in the wire was small, and the toughness was poor.

In Test No. 122, an amount of Ni in the wire was large, and the creep strength was poor.

In Test No. 123, an amount of Mo in the wire was small, and the creep strength was poor.

In Test No. 124, an amount of Mo in the wire was large, and the toughness was poor.

In Test No. 125, an amount of V in the wire was small, and the creep strength was poor.

In Test No. 126, an amount of V in the wire was large, and the toughness and creep strength were poor.

In Test No. 127, since the content exceeds an upper limit of the above relationship (1), the toughness was poor.

In Test No. 128, since the content was less than a lower limit of the above relationship (1), welding defects occurred, and the arc stability, bead appearance, toughness, and creep strength were poor.

As described above, the present description discloses the following matters.

[1] A gas shielded arc welding wire containing, based on total mass of the wire in terms of mass %:
C: 0.01% to 0.50%;
Si: 0.01% to 1.50%;
Mn: 0.10% to 2.50%;
Cr: 5% to 15%;
Ni: 0.05% to 1.50%;
Mo: 0.1% to 2.0%;
V: 0.1% to 1.0%;
Nb: 0.01% to 0.20%;
REM: 0.001% to 0.050%;
S: 0.0010% to 0.0200%; and
O: 0.025% or less (including 0%),
which satisfies the following relationship (1):

$$3.0 \leq (Nb+10 \times REM)/(S+O) \leq 200.0 \qquad (1).$$

[2] The gas shielded arc welding wire according to [1], further containing, based on total mass of the wire in terms of mass %:
N: 0.01% to 0.10%;
W: 3.0% or less (including 0%);
Co: 3.0% or less (including 0%);
Ta: 0.5% or less (including 0%);
B: 0.005% or less (including 0%); and
Cu: 2.0% or less (including 0%),
the balance consisting of Fe and inevitable impurities.

[3] The gas shielded arc welding wire according to [1] or [2], in which a ratio of the Nb content to the REM content satisfies the following relationship (2):

$$1.0 \leq Nb/REM \leq 80.0 \qquad (2).$$

[4] The gas shielded arc welding wire according to any one of [1] to [3], containing La and Ce as the REM, and a ratio of the La to the Ce satisfies the following relationship (3):

$$0.2 \leq La/Ce \leq 1.1 \qquad (3).$$

[5] The gas shielded arc welding wire according to any one of [1] to [4], containing:
REM: 0.001% to 0.050%; and
S: 0.0010% to 0.0200%,
which satisfies the following relationship (4) and the following relationship (5):

$$0.10 \leq O/S \leq 4.00 \qquad (4); \text{ and}$$

$$0.30 \leq REM/(S+O) \leq 6.50 \qquad (5).$$

[6] A gas shielded arc welding method, including welding in a shielding gas atmosphere using the gas shielded arc welding wire according to any one of [1] to [5].

[7] The gas shielded arc welding method according to [6], using an inert gas having a composition in which Ar or He is 100% or a mixed gas having a composition in which a content of Ar or He is 90% or more in volume %, as the shielding gas.

[8] The gas shielded arc welding method according to [6], using a gas having a composition in which $CO_2$ is 100% or a mixed gas having a composition in which a content of $CO_2$ is 90% or more in volume %, as the shielding gas,
in which a polarity of the welding wire side is negative.

Although various embodiments have been described with reference to the drawings, it is needless to say that the present invention is not limited to such examples. It is obvious that a person skilled in the art could conceive of various modifications or modifications within the scope of the claims, and it is understood that they naturally fall within the technical scope of the invention. In addition, the components in the above-described embodiments may be arbitrarily combined within the scope that does not deviate from the object of the invention.

This application is based on Japanese Patent Application No. 2017-240614 filed on Dec. 15, 2017, the entire subject matter of which is incorporated herein by reference.

REFERENCE SIGN LIST

1 Welding system
10 Robot
11 Welding torch
20 Robot control unit
30 Welding power supply
40 Teaching device

The invention claimed is:
1. A gas shielded arc welding wire comprising, in mass % based on a total mass of the gas shielded arc welding wire:
C: 0.01% to 0.50%;
Si: 0.01% to 1.50%;
Mn: 0.10% to 2.50%;
Cr: 5% to 15%;
Ni: 0.05% to 1.50%;
Mo: 0.1% to 2.0%;
V: 0.1% to 1.0%;
Nb: 0.01% to 0.20%;
a rare earth metal element (REM): 0.012% to 0.050%;
S: 0.0010% to 0.0200%; and
O: 0.025% or less, including 0%,
wherein $3.0 \leq (Nb+10 \times REM)/(S+O) \leq 200.0$,
wherein the REM comprises La and Ce, and a mass ratio of La to Ce satisfies:

$$0.2 \leq La/Ce \leq 1.1,$$

wherein mass % of O, S, and REM satisfies:

$$0.10 \leq O/S \leq 4.00; \text{ and}$$

$$0.30 \leq REM/(S+O) \leq 6.50,$$

wherein the gas shielded arc welding wire shows less than ten times of arc deflection for 30 seconds during welding.

2. The gas shielded arc welding wire according to claim 1, further comprising, based on a total mass of the gas shielded arc welding wire in terms of mass %:
N: 0.01% to 0.10%;
W: 3.0% or less (including 0%);
Co: 3.0% or less (including 0%);
Ta: 0.5% or less (including 0%);
B: 0.005% or less (including 0%); and
Cu: 2.0% or less (including 0%),
wherein the balance consists of Fe and inevitable impurities.

3. The gas shielded arc welding wire according to claim 1, wherein a mass ratio of the Nb content to the REM content satisfies the following relationship:

$$1.0 \leq Nb/REM \leq 80.0.$$

4. A gas shielded arc welding method, comprising welding in a shielding gas atmosphere using the gas shielded arc welding wire according to claim 1.

5. The gas shielded arc welding method according to claim 4, wherein the shielding gas is an inert gas comprising 100 vol % Ar or He, or the shielding gas is a mixed gas comprising 90 vol % or more of Ar or He relative to a total volume of the shielding gas.

6. The gas shielded arc welding method according to claim 4, wherein the shielding gas comprises 100 vol % CO2, or the shielding gas is a mixed gas comprising 90 vol % or more of CO2 relative to a total volume, and
wherein a polarity of a welding wire side of the gas shielded arc welding wire is negative.

7. The gas shielded arc welding wire according to claim 2, wherein a mass ratio of the Nb content to the REM content satisfies the following relationship:

$$1.0 \leq Nb/REM \leq 80.0.$$

8. A gas shielded arc welding method, comprising welding in a shielding gas atmosphere using the gas shielded arc welding wire according to claim 2.

9. The gas shielded arc welding method according to claim 8, wherein the shielding gas is an inert gas comprising 100 vol % Ar or He, or the shielding gas is a mixed gas comprising 90 vol % or more of Ar or He relative to a total volume of the shielding gas.

10. The gas shielded arc welding method according to claim 8, wherein the shielding gas comprises 100 vol % CO2, or the shielding gas is a mixed gas comprising 90 vol % or more of CO2 relative to a total volume, and
wherein a polarity of a welding wire side of the gas shielded arc welding wire is negative.

11. The gas shielded arc welding wire according to claim 1, wherein mass % of O and S satisfies:

$$0.11 \leq O/S \leq 4.00.$$

12. The gas shielded arc welding wire according to claim 1, wherein the gas shielded arc welding wire shows less than ten times of arc deflection for 30 seconds under welding conditions including a wire diameter of 1.2 mm, a welding current of 280 A, an arc voltage of 30 V, and a welding speed of 30 cm/min.

* * * * *